(12) United States Patent
Furusawa et al.

(10) Patent No.: US 10,493,577 B2
(45) Date of Patent: Dec. 3, 2019

(54) DUST COLLECTION DEVICE FOR ELECTRIC POWER TOOL, ELECTRIC POWER TOOL, AND DUST COLLECTION SYSTEM

(71) Applicant: MAKITA CORPORATION, Anjo-shi, Aichi (JP)

(72) Inventors: Masanori Furusawa, Anjo (JP); Keita Mori, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 256 days.

(21) Appl. No.: 15/608,012

(22) Filed: May 30, 2017

(65) Prior Publication Data

US 2018/0021905 A1  Jan. 25, 2018

(30) Foreign Application Priority Data

Jul. 21, 2016 (JP) .................. 2016-143597
Jul. 21, 2016 (JP) .................. 2016-143598
Jul. 21, 2016 (JP) .................. 2016-143599
Jul. 21, 2016 (JP) .................. 2016-143600

(51) Int. Cl.
  *B23Q 11/00* (2006.01)
  *B25F 5/02* (2006.01)
  *B23B 47/34* (2006.01)

(52) U.S. Cl.
  CPC .......... *B23Q 11/0046* (2013.01); *B23B 47/34* (2013.01); *B23Q 11/0071* (2013.01); *B25F 5/02* (2013.01); *B23B 2270/30* (2013.01); *B23B 2270/62* (2013.01)

(58) Field of Classification Search
  CPC ....... B23Q 11/0046; B25F 5/02; B24B 55/10; B24B 55/12
  USPC ......................................................... 451/453
  See application file for complete search history.

(56) References Cited

U.S. PATENT DOCUMENTS 1,660,532 A * 2/1928 Steinbach ............... B24B 55/06
                                                    29/DIG. 104
1,792,313 A * 2/1931 La Measure ............. D06G 1/00
                                                    15/23
4,765,099 A * 8/1988 Tanner .................. B24B 55/102
                                                    451/359

(Continued)

FOREIGN PATENT DOCUMENTS

| EP | 2732914 A1 * | 5/2014 | ......... B23Q 11/0046 |
| JP | 2011-212833 A | 10/2011 | |
| JP | 5502581 B2 | 5/2014 | |

*Primary Examiner* — George B Nguyen
(74) *Attorney, Agent, or Firm* — Oliff PLC

(57) ABSTRACT

A dust collection device for an electric power tool includes a main body case that includes an air exhaust port and is attachable to a hammer drill, a dust box provided therein with a filter, and a tubular sliding portion that has a base end connected to a connection port provided on the main body case, that includes a suction port at its front end, and that is slidable in a front-rear direction, and includes therein a dust collection path formed to pass from the suction port through the filter to the air exhaust port. The connection port is provided on a side surface of the main body case, and connected to a flexible hose serving as a base end of the sliding portion, and a side surface of the dust box is provided with an inlet port communicating with the connection port.

17 Claims, 15 Drawing Sheets

(56) References Cited

U.S. PATENT DOCUMENTS

| | | | | |
|---|---|---|---|---|
| 4,967,516 A * | 11/1990 | Hoshino | ............... | B24B 55/105 |
| | | | | 451/359 |
| 5,129,467 A * | 7/1992 | Watanabe | .......... | B23Q 11/0046 |
| | | | | 173/217 |
| 5,199,501 A * | 4/1993 | Kluber | ............... | B23Q 11/0046 |
| | | | | 173/171 |
| 6,848,985 B2 * | 2/2005 | Lamprecht | ......... | B23Q 11/0046 |
| | | | | 408/67 |
| 6,851,898 B2 * | 2/2005 | Ege | .................... | B23Q 11/0046 |
| | | | | 408/241 S |
| 7,017,680 B2 * | 3/2006 | Arich | ................... | B23Q 1/0009 |
| | | | | 173/171 |
| 8,388,283 B2 * | 3/2013 | Decker | .................. | B23B 5/166 |
| | | | | 409/134 |
| 9,776,296 B2 * | 10/2017 | Brewster | ................ | B23Q 11/00 |
| 2005/0150199 A1 * | 7/2005 | Michele | .................... | B04C 3/04 |
| | | | | 55/385.1 |
| 2005/0281627 A1 * | 12/2005 | Britz | ................. | B23Q 11/0046 |
| | | | | 408/67 |
| 2011/0226502 A1 * | 9/2011 | Bito | .................. | B23Q 11/0046 |
| | | | | 173/197 |
| 2012/0043101 A1 * | 2/2012 | Ishikawa | ............ | B23Q 11/0046 |
| | | | | 173/75 |
| 2013/0183111 A1 * | 7/2013 | Lerch | ............... | B23Q 11/0071 |
| | | | | 408/56 |
| 2014/0093320 A1 * | 4/2014 | Sullivan | ............. | B23Q 11/0046 |
| | | | | 408/67 |
| 2018/0200852 A1 * | 7/2018 | Yoshikane | ......... | B23Q 11/0046 |

* cited by examiner

DUST COLLECTION DEVICE FOR ELECTRIC POWER TOOL, ELECTRIC POWER TOOL, AND DUST COLLECTION SYSTEM

BACKGROUND

This application claims the benefit of Japanese Patent Application Numbers 2016-143597, 2016-143598, 2016-143599, 2016-143600 filed on Jul. 21, 2016, the entirety of which is incorporated by reference.

TECHNICAL FIELD

The present invention relates to a dust collection device for an electric power tool to be attached to an electric power tool, such as an electric drill or a hammer drill, to an electric power tool equipped with the dust collection device for an electric power tool, and to a dust collection system including the electric power tool and the dust collection device for an electric power tool.

RELATED ART

An electric power tool, such as an electric drill or a hammer drill, is equipped with a dust collection device that collects dust produced from material being processed during, for example, a drilling operation. A device disclosed in Japanese Patent Application Publication No. 2011-212833 (JP 2011-212833 A) is known as such a dust collection device for an electric power tool. A dust collection attachment (dust collection device) disclosed therein is configured such that an L-shaped casing is equipped with a dust box on its front surface and a sliding portion facing forward is attached to its upper portion. The sliding portion, which has a suction port at the front end thereof, extends and contracts in the front-rear direction. A dust collection fan and a motor are provided in a lower rear portion of the casing. Terminals are provided between a front surface of the electric power tool, such as the hammer drill, and a rear surface of the casing. The terminals are electrically coupled to each other in the state where the electric power tool and the casing are attached to each other so that power supply for the motor is obtained from the hammer drill as soon as the dust collection attachment is attached.

In the conventional dust collection attachment described above, an inlet port of the dust box is open rearward on the upper side of a filter, and is connected to the sliding portion through a U-shaped duct. As the sliding portion projects rearward at an upper portion of the casing, the shape of the housing of the attachable electric power tool is limited. Further, the dust suctioned from the inlet port of the dust box is directly accumulated in an upper portion of the filter. Consequently, the filter is likely to be clogged.

Thus, an object of the present invention is to provide a dust collection device for an electric power tool, an electric power tool, and a dust collection system in which the sliding portion does not become an obstacle, and the filter is hardly clogged.

SUMMARY

To achieve the object described above, according to a first aspect of the present invention, a dust collection device for an electric power tool includes a main body case, a dust box in which a filter is provided, and a tubular sliding portion. The main body case includes an air exhaust port and is attachable to an electric power tool. The tubular sliding portion slidable in a front-rear direction has a base end to which a connection port provided on the main body case is connected, and further has a suction port at its front end. A dust collection path is formed in the dust collection device to extend from the suction port through the filter to the air exhaust port. The connection port is provided on a side surface of the main body case, and connected to the base end of the sliding portion. The side surface of the dust box is provided with an inlet port communicating with the connection port.

The connection port is preferably disposed on an upper half side in a central portion in the front-rear direction of the dust box.

The sliding portion is preferably disposed in a position offset in the right-left direction toward the side surface of the main body case provided with the connection port, and a hose serving as a base end is preferably connected to the connection port.

A light-emitting member configured to emit light forward is preferably provided on a front surface of the main body case.

The light-emitting member is preferably disposed at a center in the right-left direction of the front surface of the main body case.

The hose is preferably connected to the connection port from a direction intersecting with the connection port.

The connection port preferably opens rearward, and the hose is preferably connected to the connection port from behind.

The connection port is preferably provided with an L-shaped tubular elbow that opens rearward, and the hose is preferably connected to the connection port from behind through the elbow.

A predetermined distance is preferably set between the inlet port and the filter in the dust box, and a wall is preferably provided to a side surface of the filter, which faces the inlet port.

An O-ring is preferably disposed between the connection port and the inlet port.

An accommodating recess configured to accommodate the dust box is preferably formed on the main body case so as to open forward, and the dust box is preferably attachable to and detachable from the accommodating recess at the front.

A motor and a dust collection fan are preferably accommodated in the main body case, and the main body case is preferably provided therein with a partitioning portion partitioning a flow path of an air flow passing through an accommodating chamber for the motor from wiring in the main body case to inhibit contact between the air flow and the wiring.

The main body case is preferably formed by assembling a pair of right and left half-split cases, and the partitioning portion is preferably formed by butting ribs provided in an erect manner on respective inner surfaces of the half-split cases to each other.

To achieve the object described above, according to a second aspect of the present invention, an electric power tool includes the dust collection device for an electric power tool according to the first aspect attached to the electric power tool.

To achieve the object described above, according to a third aspect of the present invention, a dust collection system includes an electric power tool and the dust collection device for an electric power tool according to the first aspect of the present invention. In the system, the electric power tool is provided, on an outer surface of a housing, with a guide groove for attaching the dust collection device. In the housing, an electric power tool side terminal exposed through a plug-in port and a shutter member are disposed. The shutter member is configured to close the plug-in port when the dust collection device for an electric power tool is not attached. The dust collection device for an electric power tool according to the first aspect of the present invention includes the main body case in which a rail portion and a dust collection side terminal are provided. The rail portion is attached to the housing by fitting with the guide groove. The dust collection side terminal is electrically coupled to the electric power tool side terminal by being inserted from the plug-in port when the dust collection device is attached to the housing.

The shutter member is provided with a coupling portion configured to project into the guide groove in a close position of the plug-in port. The rail portion is configured to engage with the coupling portion and to move the shutter member to an open position of the plug-in port when the rail portion of the main body case fits with the guide groove of the housing.

According to the present invention, the base end of the sliding portion is provided on the side surface of the dust box, and the inlet port of the dust box is provided on the connection port side. Thus, the sliding portion does not become an obstacle by projecting rearward, and the shape of the housing of the electric power tool is less likely to be limited. Since the dust is suctioned from the side surface of the dust box, the filter is less likely to be clogged.

When the connection port is disposed on the upper half side in the central portion in the front-rear direction of the dust box, the dust is hardly stuck even if the connection port is provided at the side surface.

When the sliding portion is disposed in the position offset toward the side surface on the connection port side, the sliding portion that has moved back does not interfere with the electric power tool, so that the slide stroke can be set to a large value.

When the hose is connected from the direction intersecting with the connection port, the amount of projection can be reduced even if the sliding portion is offset in the right-left direction.

When the connection port opens rearward, and the hose is connected from behind, the sliding portion that slides forward and rearward can be connected to the connection port without difficulty.

When the predetermined distance is set between the inlet port and the filter of the dust box, and the wall is provided to the side surface of the filter, the dust having entered through the inlet port does not come into direct contact with the side surface of the filter. Thus, the side surface of the filter facing the inlet port is prevented from being clogged.

DETAILED DESCRIPTION

Figure 1:
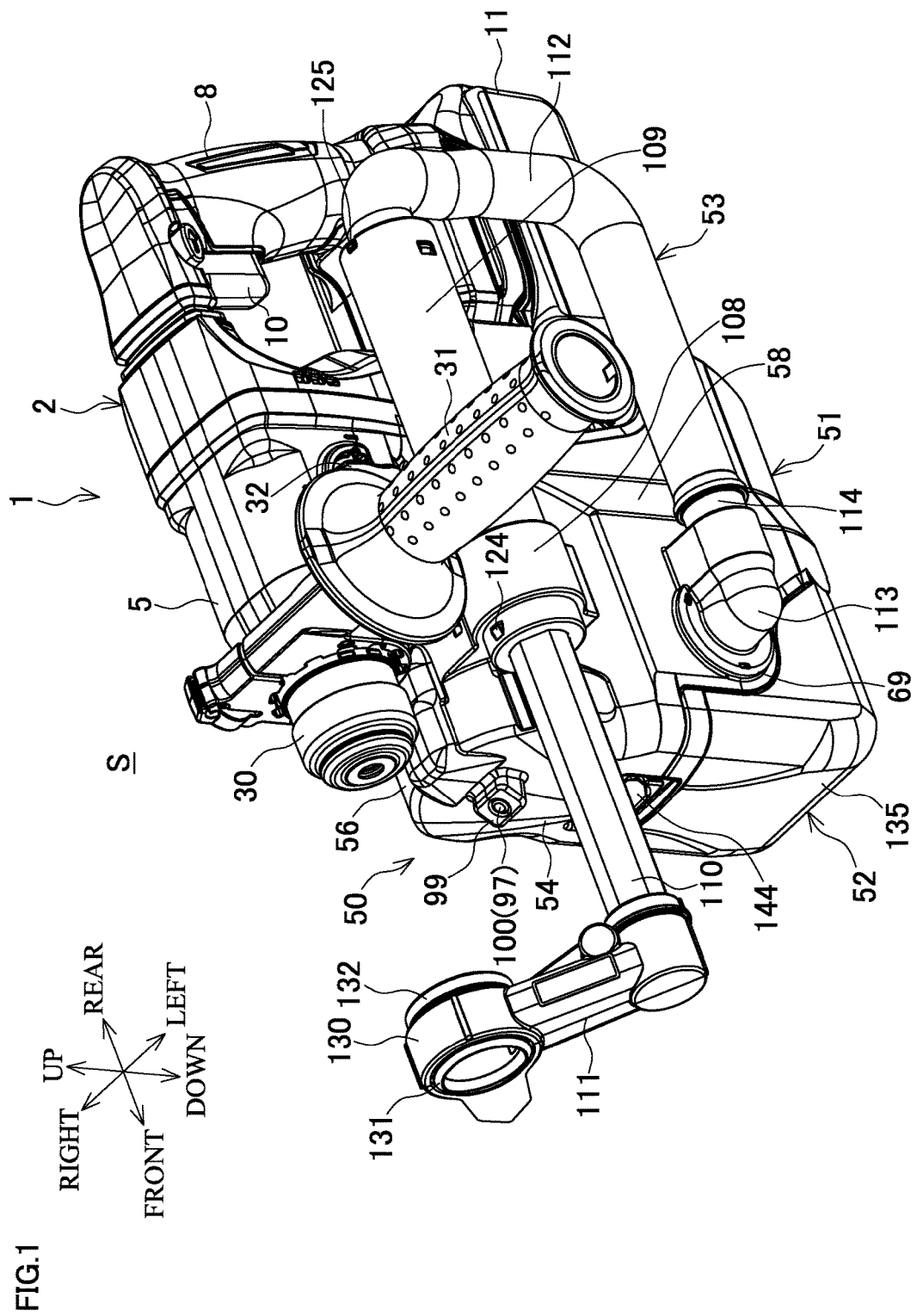
FIG. 1 is a perspective view from the front of a dust collection system.
Figure 2:
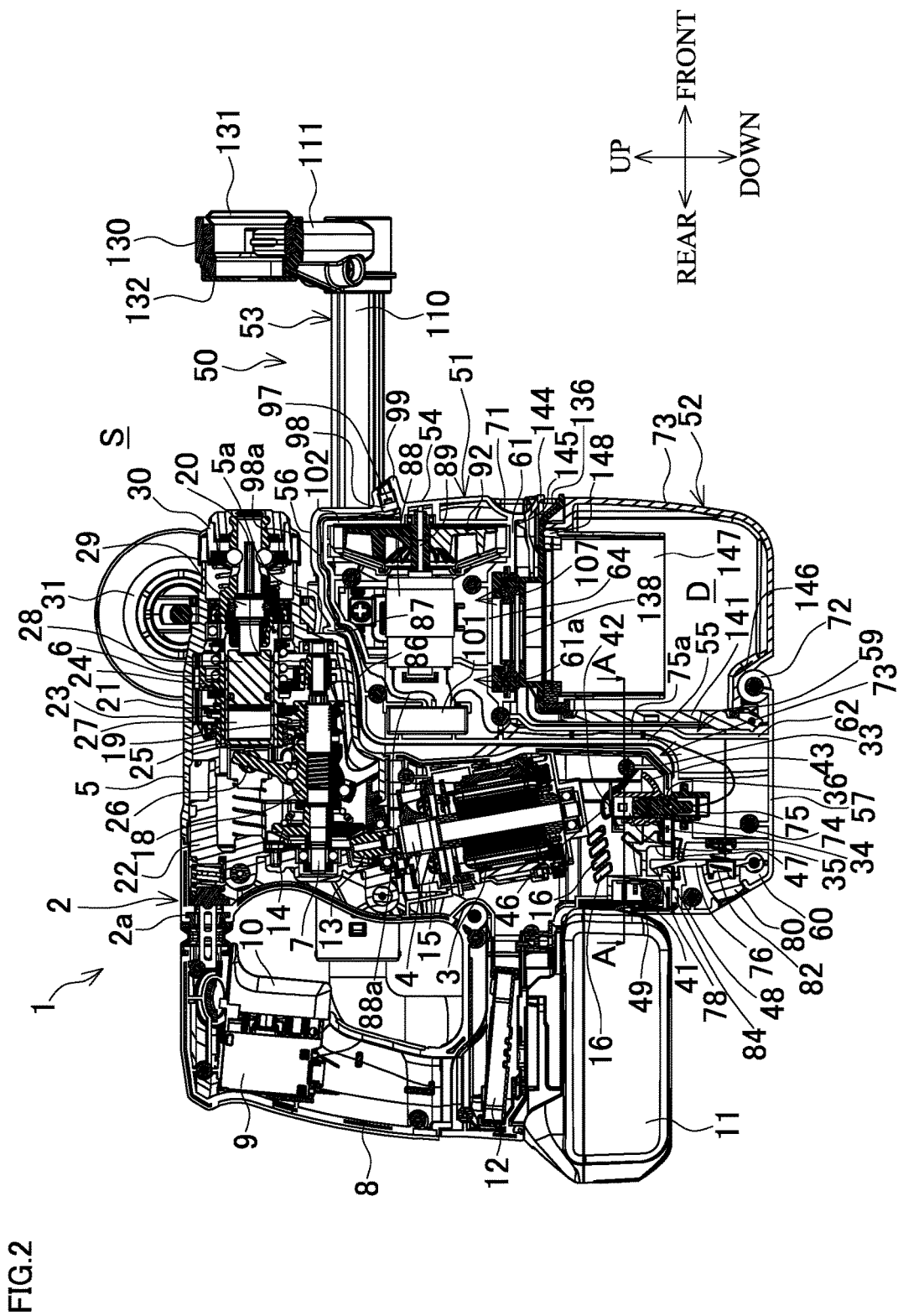
FIG. 2 is a central vertical sectional view of the dust collection system.
Figure 3:
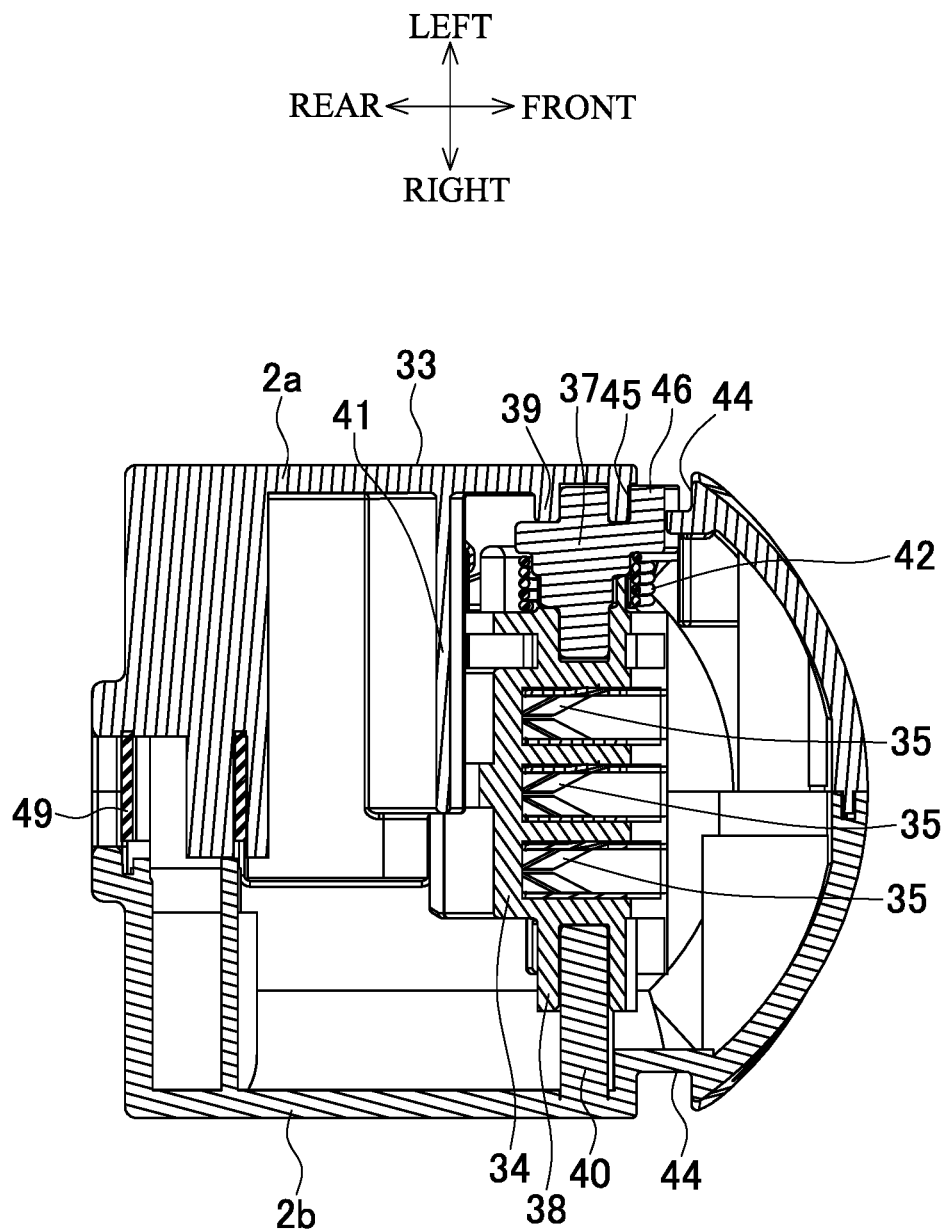
FIG. 3 is an A-A line enlarged sectional view of a main body housing alone in FIG. 2.
Figure 4:
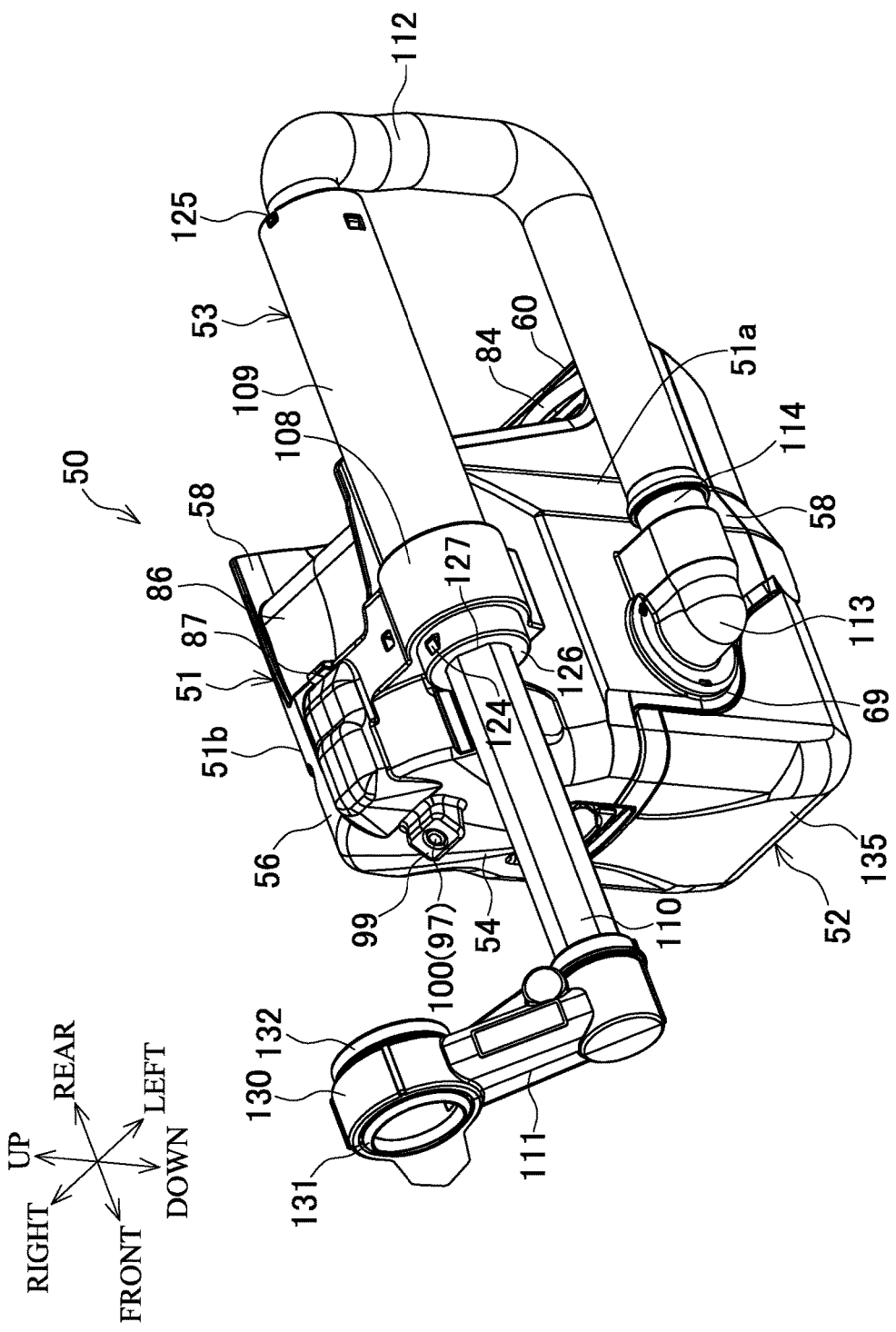
FIG. 4 is a perspective view from a front upper side of a dust collection device for an electric power tool.
Figure 5:
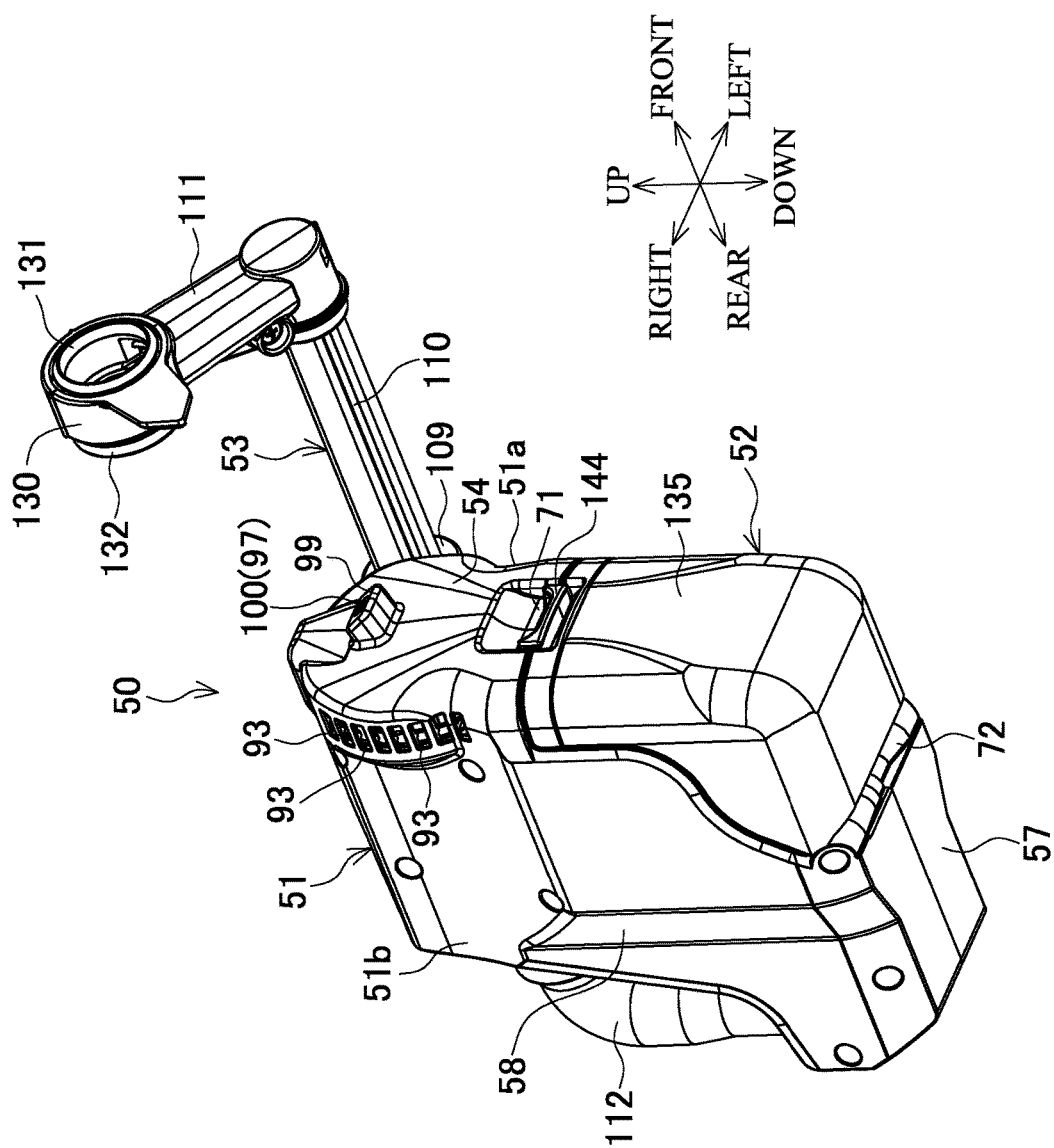
FIG. 5 is a perspective view from a front lower side of the dust collection device for an electric power tool.

The following describes an embodiment of the present invention based on the drawings. FIG. 1 is a perspective view from the front, FIG. 2 is a central vertical sectional view, and FIG. 3 is an A-A line enlarged sectional view of a main body housing alone, each illustrating an example of a dust collection system S in which a dust collection device for an electric power tool (hereinafter, simply called a "dust collection device") is attached to a hammer drill serving as an electric power tool.

Description of Hammer Drill

A hammer drill 1 is configured such that a tapered cylindrical front housing 5 accommodating a tool holder 6 and a rotatable intermediate shaft 7 is provided so as to project forward at a front upper portion of a main body housing 2. The main body housing 2 is formed by screwing together left and right half-split housings 2a and 2b. The front housing 5 accommodates a brushless motor 3, for example. A handle 8 accommodating a switch 9 provided with a trigger 10 is disposed at a rear upper portion of the main body housing 2. A battery pack 11 is slidingly attached to a rear lower portion of the main body housing 2 from the rear and serves as a power source. An electric power tool side controller 12 is accommodated above the battery pack 11.

The brushless motor 3 is accommodated in the main body housing 2 in a tilted attitude with a rotating shaft 4 directed upward and obliquely rearward. A first gear 13, which is provided at a distal end of the rotating shaft 4, projects into the front housing 5 and meshes with a second gear 14 provided on the intermediate shaft 7. A centrifugal fan 15, which is fixed to the rotating shaft 4, rotates to suction external air from electric power tool side air intake ports 16 formed in the right and left side surfaces of the main body housing 2 below the brushless motor 3. The air is exhausted from electric power tool side air exhaust ports 17 (FIG. 13) formed in the right and left side surfaces of the main body housing 2 outside the centrifugal fan 15, whereby an air flow is generated to cool the brushless motor 3.

The intermediate shaft 7 is provided with a rotatable boss sleeve 18, a clutch 19, and a third gear 20 in front of the second gear 14. The boss sleeve 18 is formed separately from the intermediate shaft 7. The clutch 19 rotates in an integrated manner with the intermediate shaft 7 and is slidable forward and rearward. The third gear 20 is slidable forward and rearward to be disengaged from the intermediate shaft 7 in a forward-moved position and engaged with the intermediate shaft 7 to rotate in an integrated manner therewith in a rearward-moved position. The clutch 19 moves forward and rearward in conjunction with the tool holder 6 via a locking plate 21 provided on the tool holder 6, and engages with the boss sleeve 18 in the rearward sliding position.

The front housing 5 holds therein an inner housing 22 that supports the rear ends of the tool holder 6 and the intermediate shaft 7. The tool holder 6 is urged by a coil spring 23 provided between the tool holder 6 and the inner housing 22 so as to project toward the forward-moved position. A fourth gear 24 engaging with the third gear 20 of the intermediate shaft 7 is provided on the outer circumference of the tool holder 6. A piston cylinder 25 is arranged inside the tool holder 6 so as to be movable forward and rearward. The rear end of the piston cylinder 25 is connected to an arm 26 provided on the boss sleeve 18. A striker 28 is accommodated in the piston cylinder 25 so as to be capable of reciprocating forward and rearward with an air chamber 27 interposed therebetween. An impact bolt 29 is accommodated in front of the striker 28, and is abuttable on the rear end of a bit (not illustrated) inserted in the front end of the tool holder 6. An operation sleeve 30 for attaching and detaching the bit is provided at the front end of the tool holder 6. A side handle 31 is provided at the front end of the front housing 5 behind the operation sleeve 30.

A left side surface of the front housing 5 is provided with a mode switching lever 32. The mode switching lever 32 is rotated to select a drill mode, a hammer drill mode, or a hammer mode. In the drill mode, the tool holder 6 is restricted from moving rearward to maintain the clutch 19 in the forward-moved position apart from the boss sleeve 18, and the third gear 20 is connected to the intermediate shaft 7. In the hammer drill mode, the tool holder 6 is not restricted from moving rearward so as to be movable to the rearward-moved position together with the clutch 19, and the clutch 19 that has moved engages with the boss sleeve 18. In the hammer mode, the tool holder 6 is not restricted from moving rearward so as to be movable to the rearward-moved position together with the clutch 19, and the third gear 20 moves forward so as not to transmit the rotation of the intermediate shaft 7. That is, in the drill mode, only the tool holder 6 is rotated by drive of the brushless motor 3. In the hammer drill mode, the boss sleeve 18, in addition to the tool holder 6, is rotated and reciprocates the piston cylinder 25, and the striker 28 strikes the impact bolt 29. In the hammer mode, only the boss sleeve 18 rotates, and the impact bolt 29 is struck.

A front lower portion of the main body housing 2 in front of a battery pack 11 serves as a connecting portion 33 to which a dust collection device 50 is connected. The connecting portion 33 includes a female connector 34 that is provided with three female terminals 35 for power supply and for communication arranged in the right-left direction and that has an opening facing downward. A quadrangular plug-in port 36 is formed in an opening manner in a lower surface of the connecting portion 33 below the female connector 34. As illustrated in FIG. 3, a support pin 37 is connected in an integrated manner to an upper left side surface of the female connector 34. A tubular portion 38 coaxial with the support pin 37 is formed on an upper right side surface of the female connector 34.

The support pin 37 is rotatably supported by a receiving recess 39 formed on an inner surface of the half-split housing 2a. A boss 40 provided so as to project from the half-split housing 2b is inserted in the tubular portion 38. The female connector 34 is swingable about the support pin 37 and the boss 40 between a downward position where the opening is located directly above the plug-in port 36 and a tilted position where the opening is tilted so as to be separated rearward from the plug-in port 36 so that the female connector 34 abuts on a stopper 41 in the connecting portion 33. A torsion spring 42 is wound about the support pin 37 with one end locked on the inner surface of the half-split housing 2a and the other end locked at the female connector 34, and urges the female connector 34 toward the tilted position.

The lower end of the female connector 34 is provided with a shutter member 43 in an integrated manner. In a closing position, the shutter member 43 is located directly above the plug-in port 36 to close the plug-in port 36 from inside when the female connector 34 is in the tilted position. In an open position, the shutter member 43 retreats from directly above the plug-in port 36 when the female connector 34 is in the downward position. A pair of guide grooves 44, 44 are provided to extend in the upper-lower direction on the right and left side surfaces of the connecting portion 33 in front of the support pin 37. A through-hole 45 is formed in a rear-side inner surface of the left-side guide groove 44. When the female connector 34 is in the tilted position (when the shutter member 43 is in the closing position), a coupling piece 46, which is provided so as to radially protrude from the support pin 37, projects from the through-hole 45. Furthermore, a locking recess 47 open downward is formed behind the plug-in port 36, and an engaging pawl 48 is provided facing forward at the lower end on a rear-side inner surface of the locking recess 47. A leaf spring 49 having a U-shape in the side view is accommodated in a manner winding around a screw boss from below behind the engaging pawl 48. The rear end of the leaf spring 49 protrudes from a rear surface of the connecting portion 33. The leaf spring 49 elastically presses a front surface of the battery pack 11 having been attached so as to prevent it from rattling in the attached state.

Description of Dust Collection Device

As illustrated in FIGS. 4 to 7, the dust collection device 50 includes a main body case 51, a dust box 52, and a tubular sliding portion 53. The main body case 51 formed by screwing together left and right half-split cases 51a and 51b is attached to the hammer drill 1. The dust box 52 is detachably attached to the main body case 51 and accumulates the dust. The tubular sliding portion 53, which is connected into the main body case 51, guides the dust suctioned from a processed position into the dust box 52. First, the main body case 51 having a box shape includes a front plate portion 54, a rear plate portion 55, an upper plate portion 56, a lower plate portion 57, and right and left side plate portions 58, 58. A lower portion of the main body case 51 has an accommodating recess 59 that is formed so as to be recessed rearward except the side plate portions 58, 58 to accommodate the dust box 52. The lower portion of the main body case 51 also includes a connecting projection 60 that is formed so as to project rearward together with the side plate portions 58, 58 and that is connected to the connecting portion 33 of the hammer drill 1.

The accommodating recess 59 is a space surrounded by a partition plate 61, a bottom plate 62, and the right and left side plate portions 58, 58. The partition plate 61 bends rearward from the lower end of the front plate portion 54 and partitions the interior of the main body case 51 from the accommodating recess 59 to form an accommodating chamber 61a for a direct-current (DC) motor 88 on the upper side. The bottom plate 62 bends downward from the rear end of the partition plate 61 and connects to the lower plate portion 57. A recess 63 having a dust collection side air intake port 64 at the center is formed in the partition plate 61. A resin ring 65 and a resin upper ring 66 are coaxially held in the recess 63 below the dust collection side air intake port 64. The upper ring 66 projecting below the lower surface of the partition plate 61 has a center hole to be covered with a mesh 67 in a tensioned state.

Figure 8:
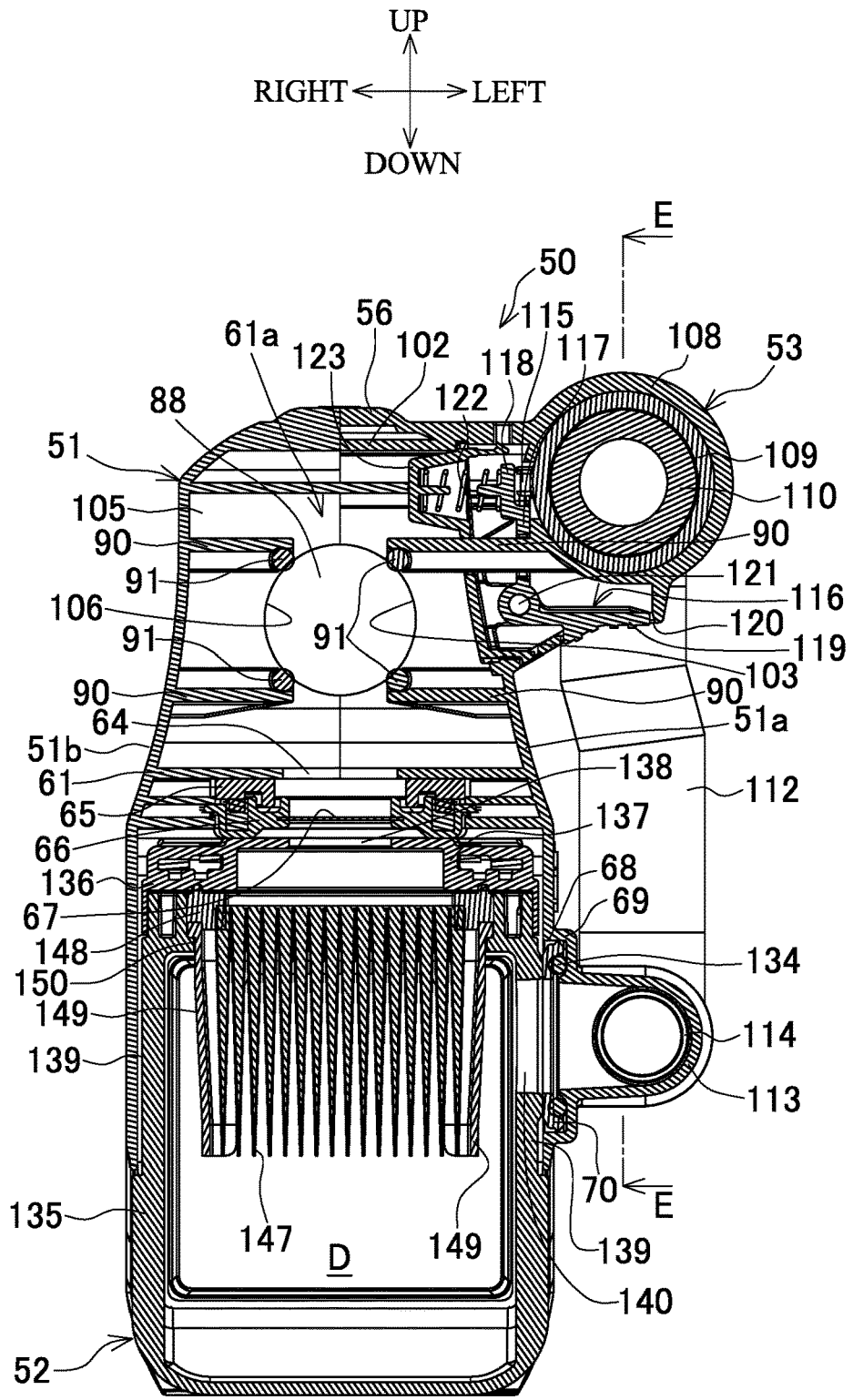
FIG. 8 is a C-C line sectional view of FIG. 7.

As illustrated in FIG. 8, the left side of the side plate portions 58 is provided with a connection port 68 including a ring-like raised portion 69 around the circumference on the outer surface side thereof. A lateral-side ring 70 made of a resin is attached from inside in a fitting manner to the connection port 68. An undercut portion 71 whose lower end projects below the partition plate 61 is provided in a recessed manner in the center of the front plate portion 54 at the front end of the partition plate 61. The lower plate portion 57 projects forward over the bottom plate 62. A support shaft 72 using a screw boss is formed in the right-left direction at the front end of the lower plate portion 57.

A fitting recess 73 fittable with the connecting portion 33 of the hammer drill 1 is formed between the right and left side plate portions 58, 58 above the connecting projection 60. The upper surface of the connecting projection 60, which serves as the bottom of the fitting recess 73, is provided with a male connector 74 projecting upward. The male connector 74 includes three male terminals 75 arranged in the right-left direction corresponding to the female terminals 35 of the hammer drill 1. The connecting projection 60 is provided therein with a hook plate 76. The hook plate 76 has a lower end that is supported by a shaft 77 extending in the right-left direction so as to be rotatable forward and rearward. The hook plate 76 is provided at the upper end with a rearward hook portion 78 projecting into the fitting recess 73 through a through-hole 79 formed in the rear plate portion 55. The hook plate 76 is swingable forward and rearward by an amount of the front-rear width of the through-hole 79. The hook plate 76 is urged toward a rearward swing position in a way that a release button 80 is pressed rearward by a coil spring 82 provided in the connecting projection 60. The release button 80 is positioned above the shaft 77 and exposed from a window 81 provided in the rear plate portion 55. A cover portion 83 covers the through-hole 79. A leaf spring 84 curving upward is held behind the hook plate 76.

Upward rail portions 85, 85 facing each other are formed on the inner surfaces of the right and left side plate portions 58, 58 in front of the male connector 74. The rail portions 85, 85 are provided in positions that fit with the guide grooves 44, 44 in the state where the connecting portion 33 is connected. The guide grooves 44, 44 are provided on the side surfaces of the connecting portion 33 of the hammer drill 1. Furthermore, a recessed surface portion 86 matching a lower surface shape of the front housing 5 of the hammer drill 1 is formed on the upper surface of the upper plate portion 56. The front end of the recessed surface portion 86 is provided with an abutting piece 87 projecting upward. The an abutting piece 87 abuts on a front end surface 5a of the front housing 5 in the state where the front housing 5 is placed on the recessed surface portion 86, the front end surface 5a extending in the upper-lower direction.

As illustrated in FIG. 8, at the center in the right-left direction in the main body case 51 above the partition plate 61, the DC motor 88 is accommodated in a forward-facing attitude with an output shaft 89 directed forward by a pair of upper and lower holding ribs 90, 90. The upper and lower holding ribs 90, 90 are provided in a mutually facing manner so as to project from the inner surfaces of the left and right half-split cases 51a and 51b via rubber pins 91, 91 held at the distal ends of the holding ribs 90, 90. A dust collection fan 92 serving as a centrifugal fan is fixed to the output shaft 89. A plurality of dust collection side air exhaust ports 93, 93 are formed in the right side plate portion 58 outside the dust collection fan 92. A baffle plate 94 is provided between the DC motor 88 and the dust collection fan 92, and guides air from the central side to the outer circumferential side. A circular rib 95 is provided in a projecting manner in the front plate portion 54, and holds a bearing 96 for the output shaft 89.

Figure 6:
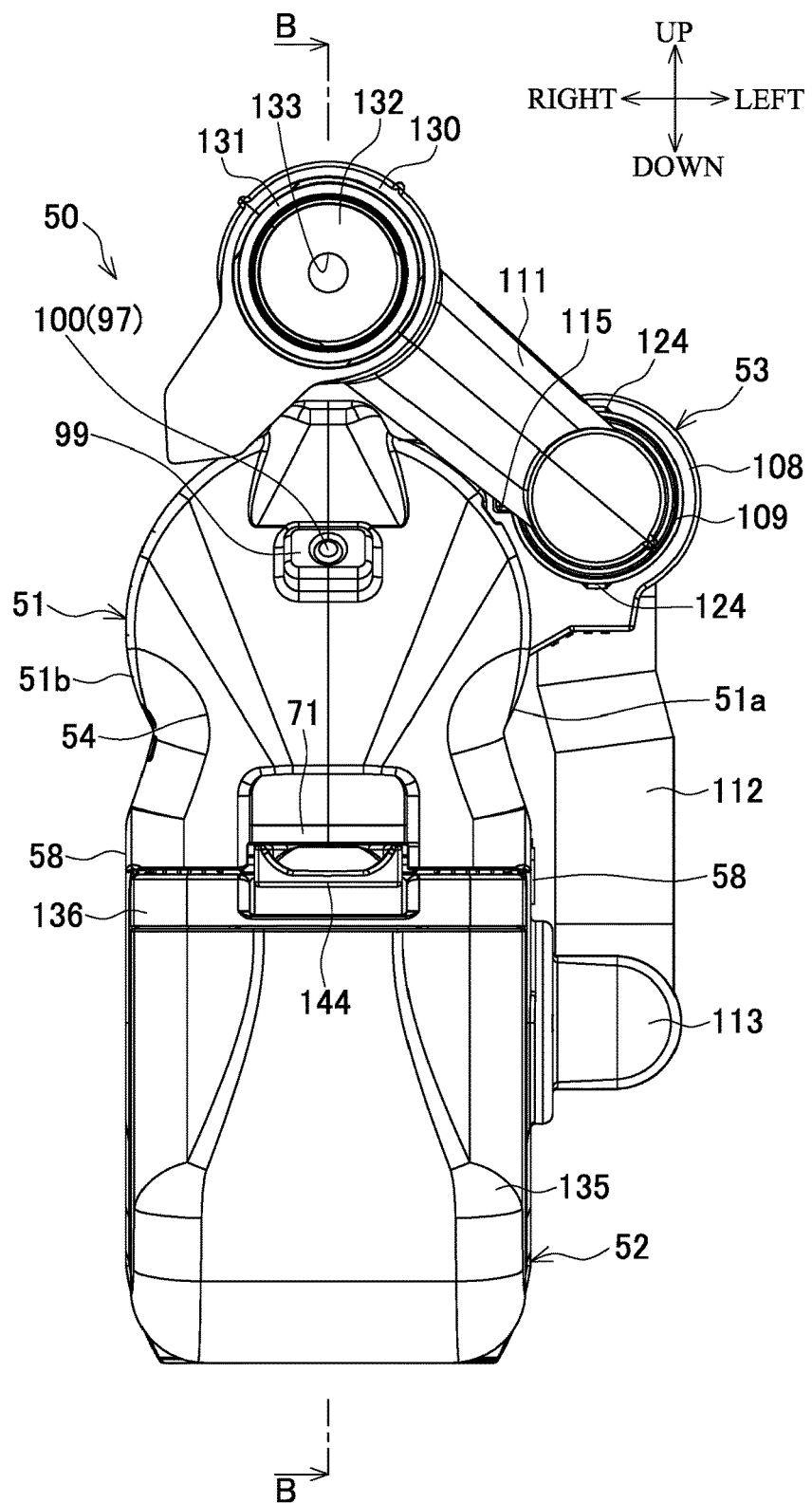
FIG. 6 is a front view of the dust collection device for an electric power tool.
Figure 7:
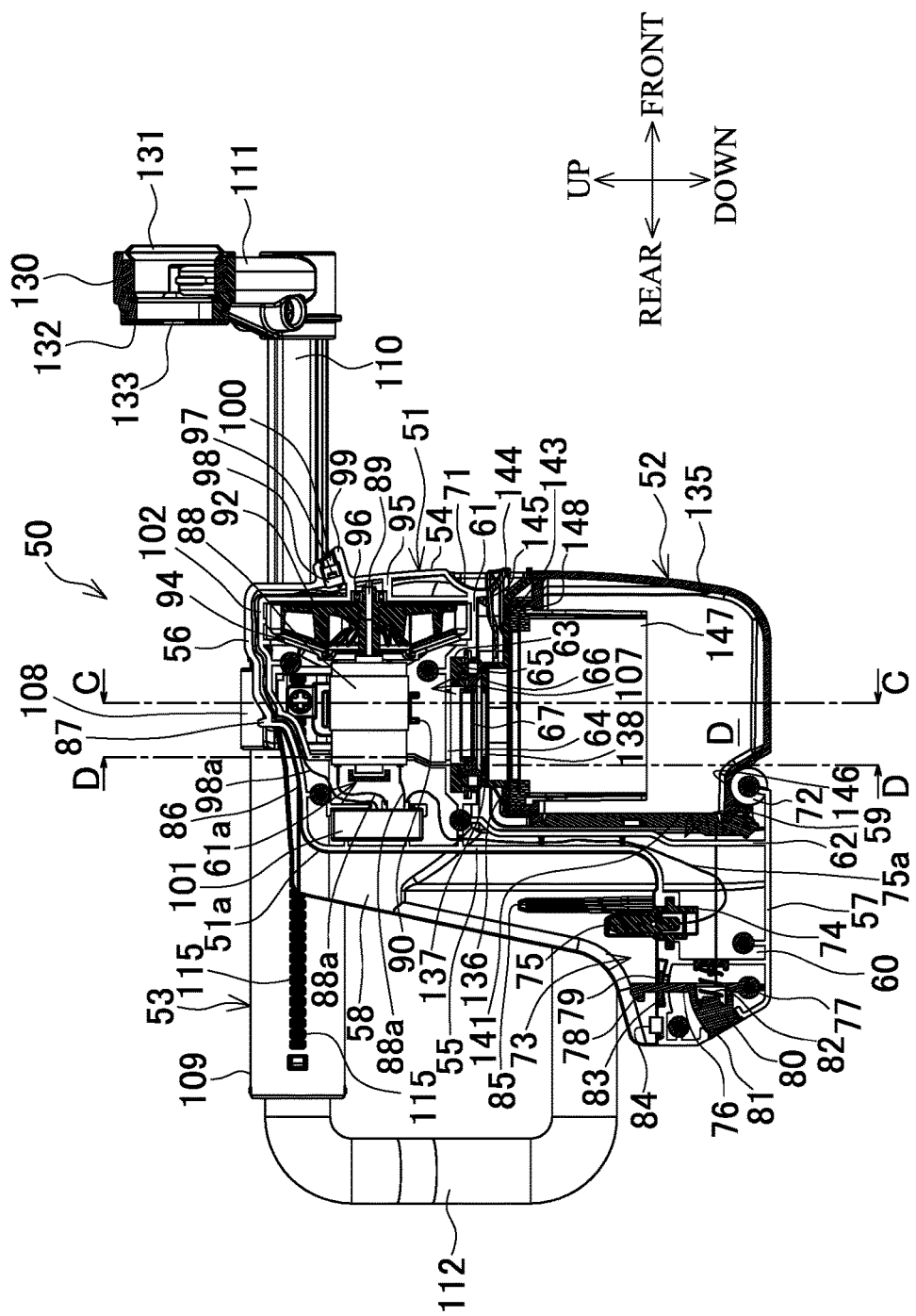
FIG. 7 is a B-B line sectional view of FIG. 6.

A light-emitting diode (LED) 97 is provided at the center in the right-left direction of the front plate portion 54 above the circular rib 95. As illustrated in FIGS. 6 and 7, the LED 97 is mounted on a substrate 98, and accommodated facing forward together with the substrate 98 in a holding tube 99 provided so as to project obliquely upward from the front plate portion 54. A lens 100 is provided at the front end of the holding tube 99 in front of the LED 97 so as to be capable of emitting light of the LED 97 obliquely in a front upper direction.

Figure 9:
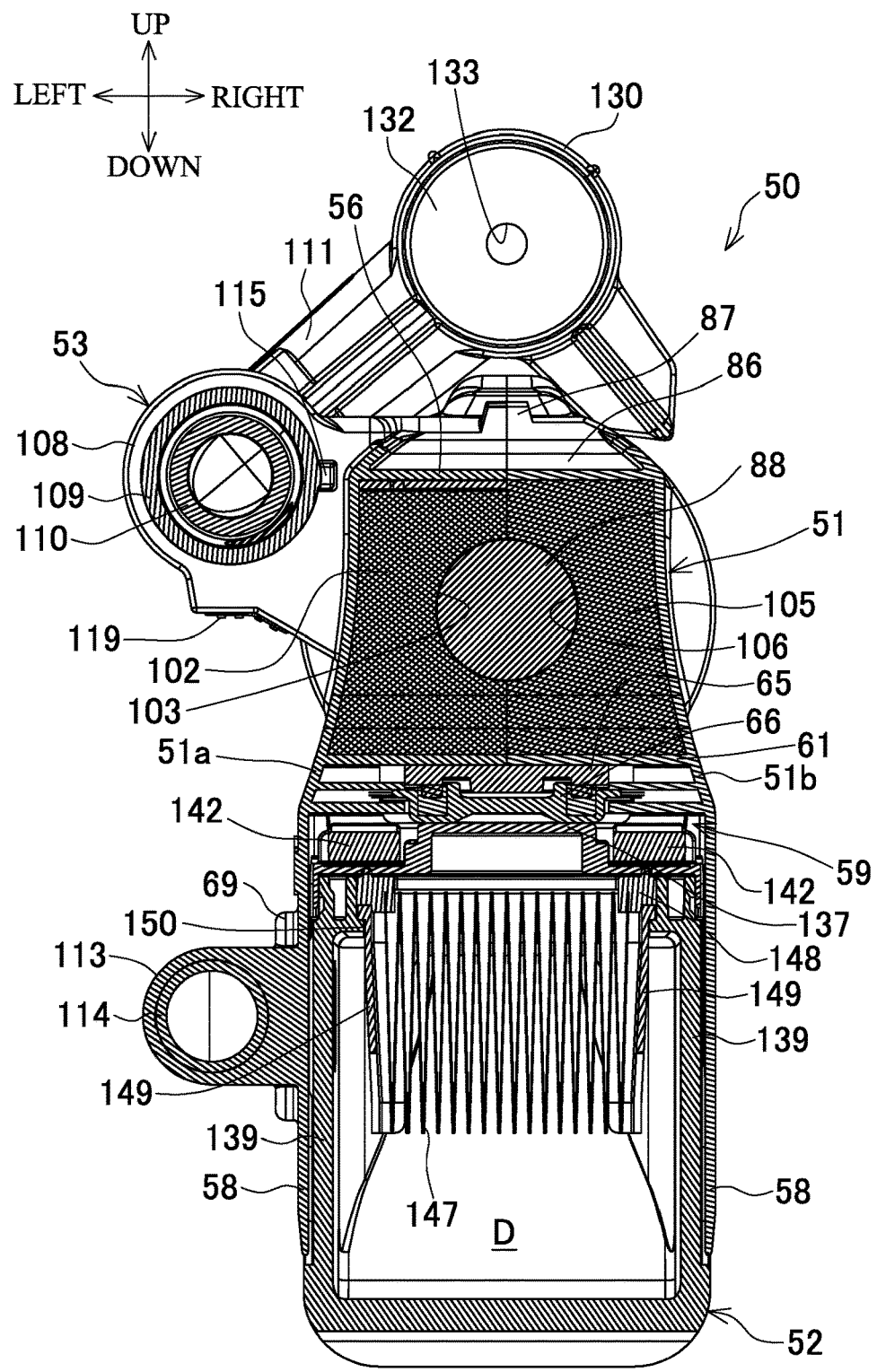
FIG. 9 is a D-D line sectional view of FIG. 7.

Furthermore, a dust collection side controller 101 is vertically accommodated in the accommodating chamber 61a so as to extend in the right-left direction behind the DC motor 88. Lead wires 75a from the male terminals 75, lead wires 88a, 88a from positive and negative terminals of the DC motor 88, and lead wires 98a from the substrate 98 are connected to the dust collection side controller 101. A square U-shaped inner rib 102 is provided in an erect manner in the left half-split case 51a. The inner rib 102 is designed to rise from the partition plate 61 at a predetermined distance inside the front plate portion 54, extend upward along the front plate portion 54 except at the circular rib 95, then extend rearward along the upper plate portion 56 at a predetermined distance inside the upper plate portion 56, extend downward in front of the dust collection side controller 101 through the rear end of the DC motor 88, and connect to the partition plate 61. As illustrated in FIGS. 8 and 9, a semicircular cutout 103 is formed on the inner rib 102 in a position through which the DC motor 88 passes.

Figure 13:
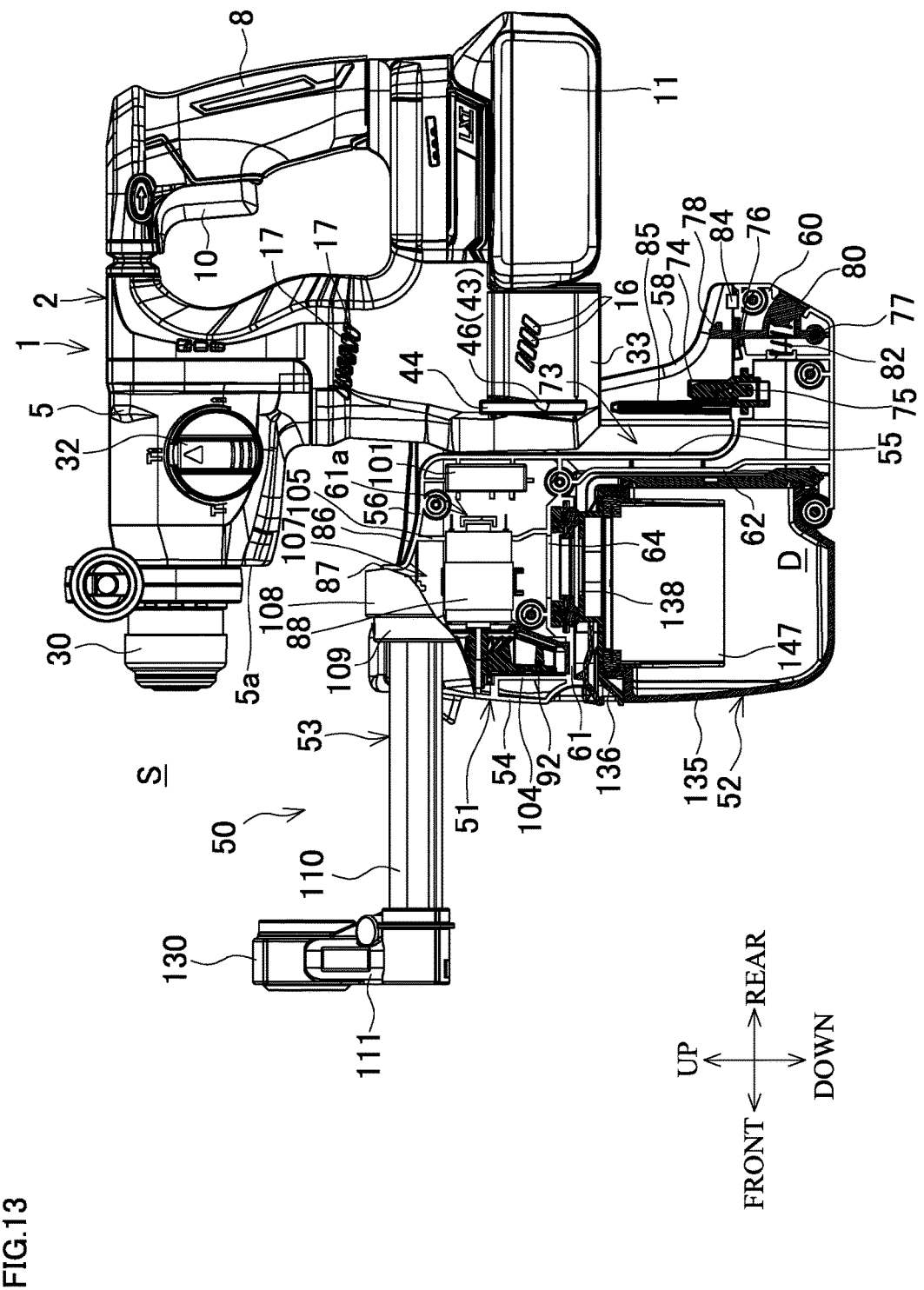
FIG. 13 is a side explanatory view illustrating an attaching operation of the dust collection device for an electric power tool to a hammer drill.

As illustrated in FIG. 13, a front vertical rib 104 is provided in an erect manner in a position in the right half-split case 51b facing the front side of the inner rib 102. The front vertical rib 104 is designed to rise from the partition plate 61 at a predetermined distance inside the front plate portion 54, extend upward along the front plate portion 54 except at the circular rib 95, and connect to the upper plate portion 56. A rear vertical rib 105 is provided in an erect manner in a position facing the rear side of the inner rib 102. The rear vertical rib 105 is designed to rise from the partition plate 61, and connect to the upper plate portion 56 through the rear end of the DC motor 88. A semicircular cutout 106 is also formed on the rear vertical rib 105 in a position through which the DC motor 88 passes.

The inner rib 102, the front vertical rib 104, and the rear vertical rib 105 define an air intake chamber 107 that encloses the DC motor 88 and the dust collection fan 92 in front of the dust collection side controller 101 in the accommodating chamber 61a. The DC motor 88 is fitted in the cutouts 103 and 106 provided on the inner rib 102 and the rear vertical rib 105. In the fitting, only the rear end of the DC motor 88 having terminals projects rearward of the air intake chamber 107, and the lead wires 88a, 88a are directly connected to the dust collection side controller 101. The lead wires 98a of the substrate 98, which are routed along the inner rib 102 outside the air intake chamber 107 in the half-split case 51a, are connected to the dust collection side controller 101. The lead wires 75a of the male terminals 75, which are routed upward through a space between the rear plate portion 55 and the bottom plate 62, are connected to the dust collection side controller 101.

Figure 10:
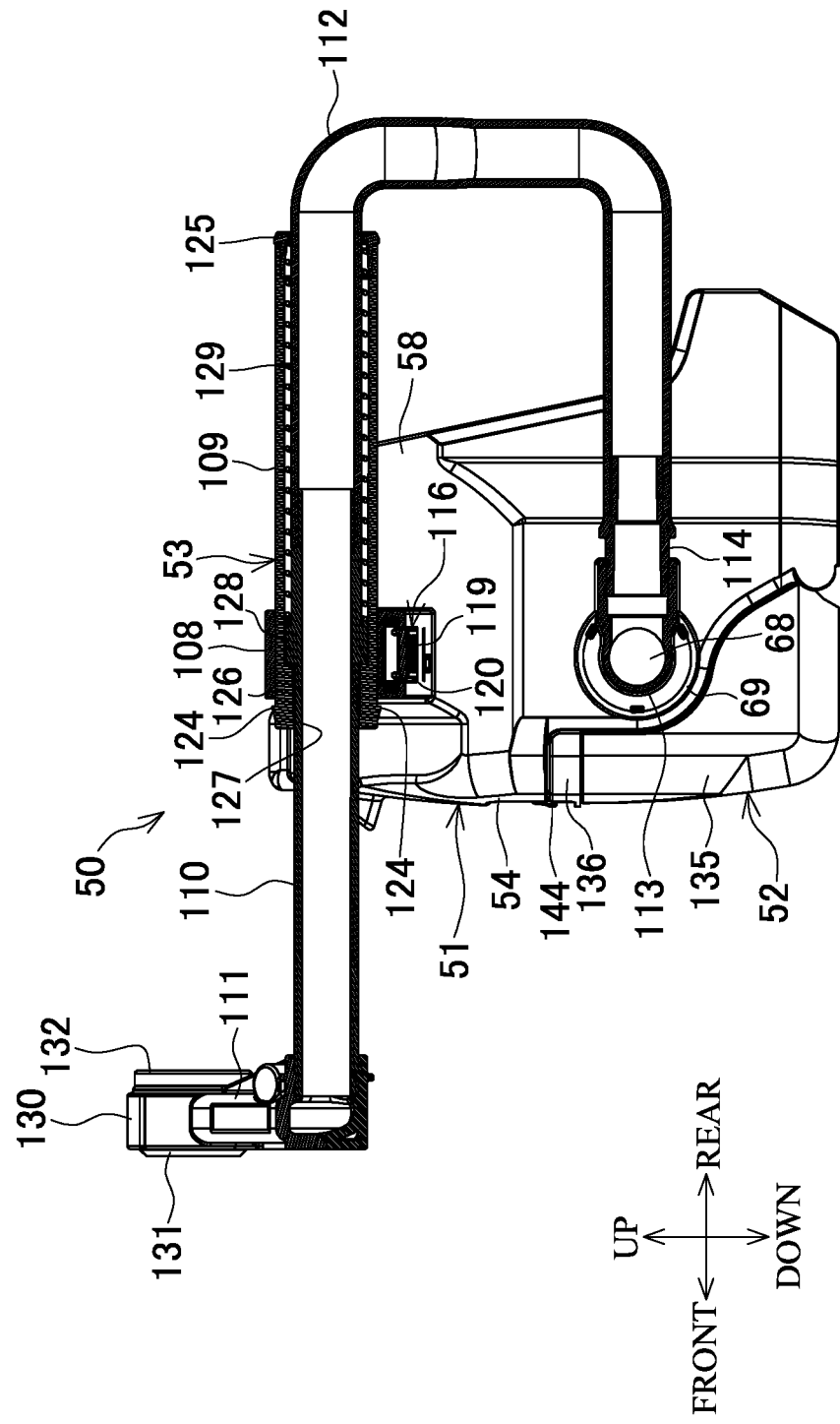
FIG. 10 is an E-E line sectional view of FIG. 8.

As illustrated in FIGS. 8 to 10, the sliding portion 53 includes an outer pipe 109, an inner pipe 110, a nozzle pipe 111, and a flexible hose 112. The outer pipe 109 is held so as to be slidable in the front-rear direction by a tubular holder 108 provided in a projecting manner at a left upper portion of the main body case 51. The inner pipe 110 is loosely inserted from front into the outer pipe 109 coaxially therewith. The nozzle pipe 111 is connected at a right angle to the front end of the inner pipe 110. The flexible hose 112 is connected between the inner pipe 110 and the main body case 51. The left side plate portion 58 of the main body case 51 is provided with an L-shaped tubular elbow 113 below the holder 108. The elbow 113 opening rearward communicates with the connection port 68. The flexible hose 112 is connected to the inner pipe 110 from behind at the upper end thereof, and connected to the elbow 113 from behind through a joint 114 at the lower end thereof.

As illustrated in FIG. 7, a side surface of the outer pipe 109, which faces the main body case 51, is provided with a plurality of projections 115 arranged at even intervals in parallel with the axial direction. As illustrated in FIG. 8, the main body case 51 is provided therein with an L-shaped locking member 116 including an upward piece 117 and a sideward piece 119. The upward piece 117 has a locking tooth 118 lockable to any of the projections 115 at the upper end thereof. The sideward piece 119 projects outward below the holder 108 and is exposed from a lower window 120 of the main body case 51. The locking member 116 is supported at a connecting portion between the upward piece 117 and the sideward piece 119 by a connection shaft 121 so as to be swingable rightward and leftward. The connection shaft 121 extends in the front-rear direction and is supported below the holder 108. The locking member 116 is urged toward a locking position where the locking tooth 118 is locked to the projection 115 by a coil spring 122. The coil spring 122 is provided between the locking tooth 118 and a receiving portion 123 that is positioned on the right side thereof and provided in the main body case 51.

In the locking position, when the sideward piece 119 is operated upward to be pushed in, the locking member 116 is rotated to separate the locking tooth 118 from the projection 115. Accordingly, the outer pipe 109 is allowed to slide in the front-rear direction within a range between a position where a front stopper 124 abuts on the front end of the holder 108 and a position where a rear stopper 125 abuts on the rear end of the holder 108. The front stopper 124 is provided on the outer circumference at the front end of the outer pipe 109. The rear stopper 125 is inserted to be attached to the rear end of the outer pipe 109. After the sideward piece 119 is released from the push-in state in any sliding position, the locking tooth 118 of the upward piece 117 that is returned to the locking position is locked to any of the projections 115, so that the sliding of the outer pipe 109 is locked.

A thick-walled portion 126 is formed on the front end side of the outer pipe 109. The thick-walled portion 126 has an inside diameter smaller than that of the rear side of the outer pipe 109, the inside diameter being the width across flats of a fitting hole 127. The inner pipe 110 passes through the thick-walled portion 126 so as to be slidable in the front-rear direction while being restricted in rotation by having an outer shape fitting with the fitting hole 127. The inner pipe 110 is provided with a ring-shaped stopper 128 on the outer circumference at the rear end thereof. The inner pipe 110 is sheathed with a coil spring 129 between the ring-shaped stopper 128 and the rear stopper 125 provided at the outer pipe 109. As a result, the inner pipe 110 is urged so as to project toward a forward-moved position where the stopper 128 abuts on the thick-walled portion 126 of the outer pipe 109 in the normal state.

The nozzle pipe 111 is provided with a tubular suction port 130 opening in the front-rear direction at the upper end thereof. The nozzle pipe 111 is obliquely connected to the inner pipe 110 so that the suction port 130 is located at the center in the right-left direction of the main body case 51 on the front upper side thereof. The suction port 130 is provided with a ring-shaped rubber seal 131 at the front opening thereof, and with a rubber cap 132, which has a through-hole 133 for the bit, at the rear opening thereof. The flexible hose 112 is connected to the rear end of the inner pipe 110 in the outer pipe 109, extends out rearward, then makes a U-turn to extend forward, and is connected from behind to the rearward opening of the elbow 113 through the joint 114. The elbow 113 is attached in a fitting manner to the raised portion 69 of the connection port 68 formed on one of the side plate portion 58 of the main body case 51. An O-ring 134 is interposed between the elbow 113 and the lateral-side ring 70. As illustrated in FIG. 10, the connection port 68 is located on the upper half side in the central portion in the front-rear direction of the dust box 52.

The dust box 52 includes a quadrangular box-like main box 135 that opens at the upper surface and the rear surface, the upper surface being closed with a cap 136. A circular projection 137 having an outlet port 138 at the center is formed on the upper surface of the cap 136. Thin-walled portions 139, 139, which are fitted with the right and left side plate portions 58, 58 of the main body case 51, are formed on the rear side on the right and left side surfaces of the main box 135. The left thin-walled portion 139 is pierced with an inlet port 140 corresponding to the connection port 68. The rear surface of the main box 135 is closed with a lid 141 that is hinged at the lower end thereof. The upper end of the lid 141 is provided with a pair of right and left locking pieces 142, 142 that are elastically locked to the upper surface of the cap 136. Thus, the lid 141 can be opened and closed by engagement and disengagement of the locking pieces 142, 142.

Figure 11:
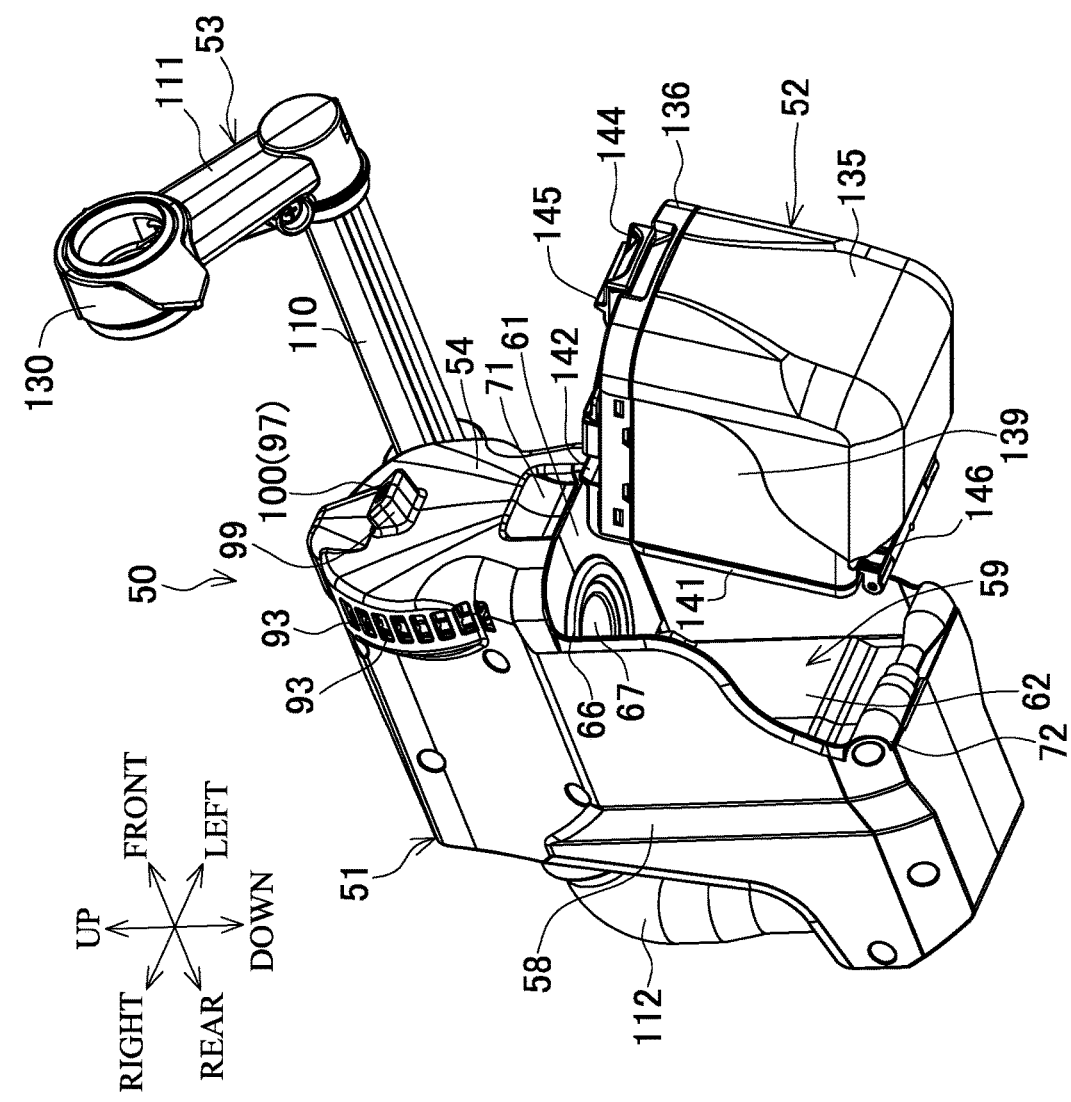
FIG. 11 is a perspective view illustrating an attaching operation of a dust box to a main body case.
Figure 12:
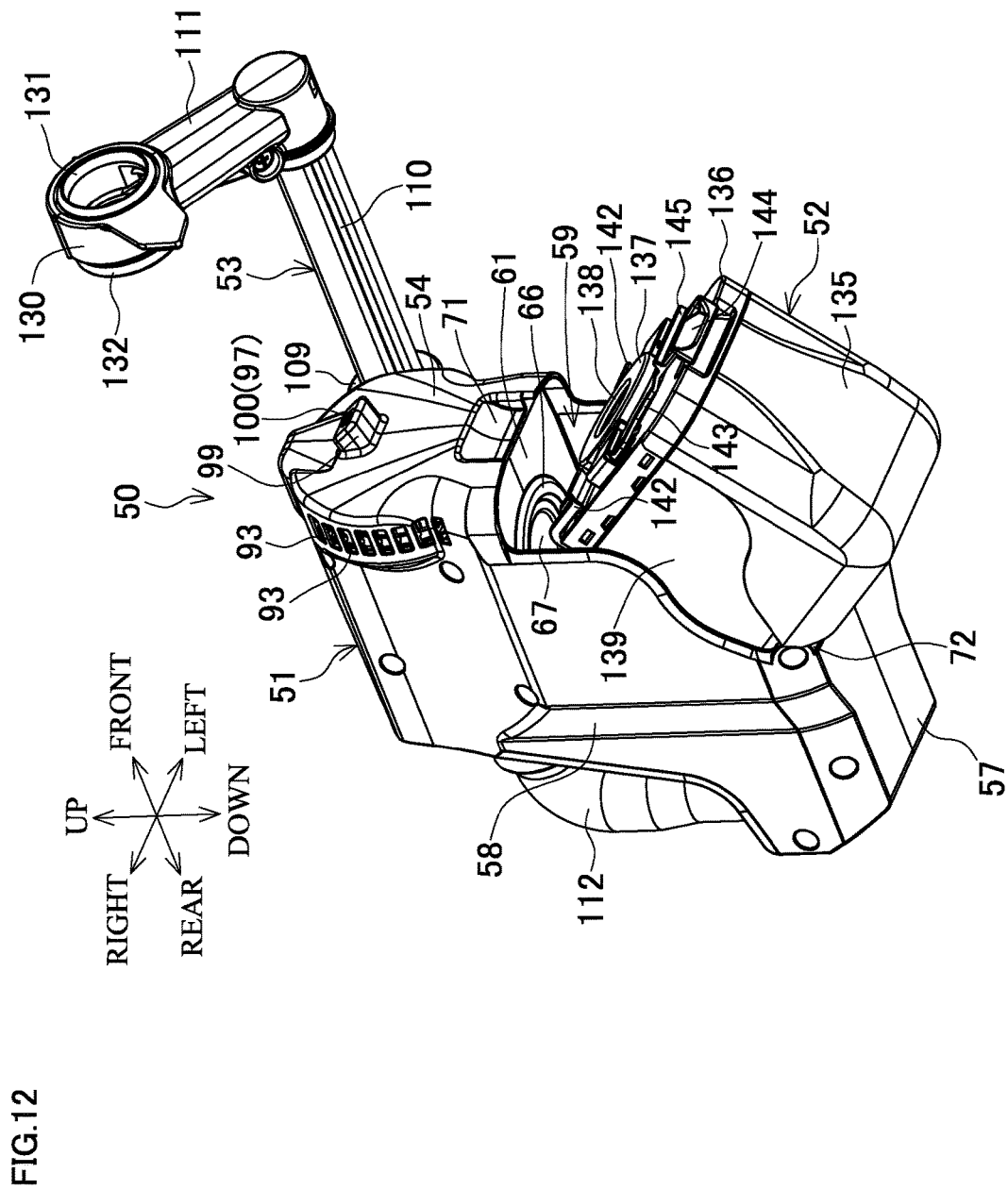
FIG. 12 is a perspective view illustrating the attaching operation of the dust box to the main body case.

Furthermore, as illustrated in FIGS. 11 and 12, the upper surface of the cap 136 is provided with an operation piece 143 in front of the circular projection 137. The operation piece 143 has a bifurcated rear end held on the cap 136, and a front end serving as a finger-operated tab 144 projecting forward above the cap 136. The upper surface of the finger-operated tab 144 is provided with a locking projection 145 facing upward in a projecting manner. The locking projection 145 is locked from inside to the lower end of the undercut portion 71 of the dust collection device 50 while the dust box 52 is accommodated in the accommodating recess 59. A groove 146, which extends in the right-left direction on the rear side of the lower surface of the main box 135, fits with the support shaft 72 of the main body case 51 while the dust box 52 is accommodated in the accommodating recess 59.

A filter 147 made of paper is provided in the main box 135. As illustrated in FIGS. 8 and 9, the paper is folded in the right-left direction whose upper end is bonded to a quadrangular frame 148. Walls 149, 149 are provided on the right and left sides of the frame 148 to interpose the filter 147 between the right and left sides thereof. Both the front and rear ends of each of the walls 149 are bent inward so as to surround the corners of the filter 147. The walls 149 and the frame 148 of the filter 147 are locked from above to receiving step portions 150 provided in the vicinity of the upper surface opening of the main box 135, so that the cap 136 is attached to the main box 135. As a result, the filter 147 and the walls 149 are placed in a hanging state in the main box 135. In this state, the left wall 149 faces the inlet port 140 at a location apart therefrom, and the right wall 149 and the front and rear surfaces of the filter 147 are also located apart from the inner surface of the main box 135 and the inner surface of the lid 141. Thus, a tubular space is continuously formed around the filter 147. The space below the filter 147 serves as a dust collection chamber D.

To attach the dust box 52 to the main body case 51, the dust box 52 is inserted from below the accommodating recess 59 of the main body case 51 such that the dust box 52 is placed in a tilted attitude in which the lid 141 is located on the rear side and the hinge is located on the upper side, as illustrated in FIG. 11. The groove 146 is fitted with the support shaft 72, as illustrated in FIG. 12. Then, in that state, the dust box 52 is rotated about the support shaft 72 and pushed into the accommodating recess 59 while the front side of the dust box 52 is lifted up. As a result, the locking projection 145 provided at the finger-operated tab 144 of the operation piece 143 is locked to the lower end of the undercut portion 71 of the main body case 51, and the attachment is completed. In this attached state, the circular projection 137 provided on the upper surface of the cap 136 abuts on the upper ring 66 of the partition plate 61 of the main body case 51, so that the outlet port 138 communicates with the dust collection side air intake port 64. At the same time, the inlet port 140 provided on the side surface abuts on the lateral-side ring 70 of the side plate portion 58 of the main body case 51 to communicate with the connection port 68.

With this configuration, a dust collection path is formed in the dust collection device 50 as follows. First, the air suctioned from the suction port 130 of the nozzle pipe 111 passes through the flexible hose 112 via the inner pipe 110, and reaches the inside of the dust box 52 from the connection port 68 and the inlet port 140 through the elbow 113. After passing through the filter 147, the air enters the air intake chamber 107 from the outlet port 138 and the dust collection side air intake port 64, and is exhausted from the dust collection side air exhaust ports 93.

When the dust box 52 is detached from the main case 51, in a sequence opposite to that of the procedure described above. The finger-operated tab 144 of the operation piece 143 is pushed down so that the locking projection 145 is unlocked from the lower end of the undercut portion 71 of the main body case 51. Accordingly, in that state, it is only necessary to rotate the dust box 52 about the support shaft 72 by pushing down the front side of the dust box 52, to disengage the groove 146 from the support shaft 72, and to take out the dust box 52 forward.

Attachment of Dust Collection Device to Hammer Drill

In the case of the hammer drill 1 and the dust collection device 50 configured as described above. The dust collection device 50 equipped with the dust box 52 is attached to the hammer drill 1. As illustrated in FIG. 13, the connecting portion 33 of the hammer drill 1 is placed in a state of abutting on the rear plate portion 55 in the fitting recess 73 of the main body case 51. In this state, the main body case 51 is slid upward (or the hammer drill 1 is slid downward), and thus the rail portions 85, 85 provided inside the side plate portions 58, 58 are relatively inserted into the guide grooves 44, 44 provided on the right and left sides of the connecting portion 33, as described above. As the left rail portion 85 abuts on and pushes up the coupling piece 46, the female connector 34 is rotated via the support pin 37 to the downward position, and the shutter member 43 retreats from the plug-in port 36 to the open position. Then, the male connector 74 of the main body case 51 enters the female connector 34 through the opening thereof, and the male terminals 75 are electrically coupled to the female terminals 35.

Along with the entrance of the male connector 74, the hook plate 76 located behind also enters the locking recess 47, and locks the hook portion 78 to the engaging pawl 48 so that the connecting projection 60 is connected to the connecting portion 33, as illustrated in FIG. 2. At this time, the leaf spring 84 of the connecting projection 60 elastically presses the lower surface of the connecting portion 33 to restrain rattling in the upper-lower direction.

The front housing 5 fits with the recessed surface portion 86 on the upper surface of the main body case 51. The abutting piece 87 abuts on the front surface of the front housing 5, thus restraining the rattling in the front-rear direction. In this attached state, the sliding portion 53 is located on the left side of the main body housing 2 of the hammer drill 1, the suction port 130 of the nozzle pipe 111 is located in front of the operation sleeve 30, and the attached bit is located coaxially with the center of the suction port 130.

The sliding position of the outer pipe 109 in the holder 108 is adjusted so that the distal end of the bit is located at the suction port 130 that is urged in a projecting manner together with the inner pipe 110. Then, the suction port 130 is brought into contact with a surface to be processed. Subsequently, the trigger 10 of the hammer drill 1 is pushed to turn the switch 9 on, and the brushless motor 3 is driven to rotate the rotating shaft 4. At this time, if the drill mode or the hammer drill mode is selected by the mode switching lever 32, the bit rotates to drill into the surface to be processed. As the drilling progresses, the bit penetrates the suction port 130, and the inner pipe 110 relatively moves back from the outer pipe 109 together with the flexible hose 112 against the urging of the coil spring 129. However, since the inner pipe 110 and the flexible hose 112 are held in the penetrating state by the holder 108 disposed on the left side of the hammer drill 1, the inner pipe 110 and the flexible hose 112 that have moved back do not interfere with the hammer drill 1, and can slide without any problem on the left side of the hammer drill 1.

Illumination and Dust Collecting Operation

Along with the ON-operation of the trigger 10, power supply and drive commands are issued to the dust collection side controller 101 that is electrically coupled to the electric power tool side controller 12 through the female terminals 35 and the male terminals 75. As a result, the dust collection side controller 101 supplies a current to the substrate 98 to light up the LED 97, and also supplies a current to the DC motor 88. The lighting up of LED 97 causes light to be emitted toward the front of the suction port 130 through the lens 100, so that the part to be processed is illuminated. In this case, since the LED 97 is provided at the center in the right-left direction of the main body case 51, the illumination can be appropriately performed from a position directly facing the part to be processed.

When the dust collection fan 92 is rotated together with the output shaft 89 by the driving of the DC motor 88, a suction force is generated in the suction port 130 of the dust collection device 50. Accordingly, the air carrying the dust produced during the processing is suctioned from the suction port 130. The suctioned air passes through the dust collection path described above, that is, passes through the filter 147 and the air intake chamber 107 and is exhausted from the dust collection side air exhaust ports 93, whereby the dust is captured by the filter 147 and accumulated in the dust collection chamber D of the main box 135. At this time, the clearance is formed on the front, rear, right, and left sides of the filter 147 in the main box 135 as described above, so that the dust entering the filter 147 from any direction is less likely to cause clogging. Further, the air having passed through the filter 147 flows into the air intake chamber 107, and cools the DC motor 88. The lead wires 88a of the DC motor 88 and the lead wires 98a of the substrate 98 are positioned in an area partitioned by the inner rib 102 and the front and rear vertical ribs 104 and 105, and wired outside the air intake chamber 107. As a result, the air flow does not come into contact with the lead wires 88a and 98a.

When the trigger 10 is released from the push-in state to turn the switch 9 off, the rotating shaft 4 of the brushless motor 3 stops rotating, and a stop command is issued to the dust collection side controller 101. The dust collection side controller 101, however, continues, using a delay circuit, to supply the power to the DC motor 88 and the LED 97 for a predetermined time from when the stop command is received. As a result, the rotation the dust collection fan 92 allows collection of the dust remaining in the inner pipe 110 and the flexible hose 112 into the dust box 52. Further, afterglow of the LED 97 can be used for illumination for another operation, such as checking of the next working position or cleanup.

Detachment of Dust Collection Device and Discharge of Dust

To detach the dust collection device 50 after the end of the operation, the release button 80 is pushed in to swing forward the hook plate 76 in order to release the locking between the hook portion 78 and the engaging pawl 48. In that state, the dust collection device 50 is slid downward, so that the male connector 74 moves away from the female connector 34 to be pulled out of the plug-in port 36. At the same time, the rail portions 85, 85 are pulled out of the guide grooves 44, 44 to release the pressing force to the coupling piece 46. Accordingly, the female connector 34 returns to the rearward tilted position, and the shutter member 43 closes the plug-in port 36. As a result, the dust collection device 50 can be detached from the hammer drill 1.

To discharge the dust from the dust box 52, the dust box 52 is detached from the front of the main body case 51 as described above. Then, the locking pieces 142, 142 of the lid 141 are disengaged from the upper surface of the cap 136, and the lid 141 is rotated to open the rear surface of the main box 135. As a result, the dust accumulated in the dust collection chamber D of the main box 135 can be discharged from the opening on the rear side. At this time, since the lid 141 can be easily opened and closed by engagement and disengagement of the locking pieces 142, 142, the dust can be easily discarded. Cleaning and replacement of the filter 147 are enabled by detaching the cap 136 from the main box 135.

Effects of the Invention Related to Light-Emitting Member

As described above, with the dust collection device 50 and the hammer drill 1 of the embodiment described above, the sliding portion 53 is disposed in a position offset leftward from the center in the right-left direction of the main body case 51, and the LED 97 emitting light forward is provided on the front surface of the main body case 51. As a result, the working position and the bit position can be appropriately irradiated before and during the operation regardless of the sliding portion 53. Particularly in this embodiment, since the LED 97 is disposed at the center in the right-left direction of the main body case 51, even the single LED 97 can surely perform the irradiation by directly facing the working position.

Since the power of the LED 97 is supplied from the hammer drill 1, a reasonable configuration is obtained in which the battery pack 11 of the hammer drill 1 is used as the power source of the LED 97. Furthermore, since the LED 97 is turned on and off in conjunction with the on/off operation of the trigger 10 provided on the hammer drill 1, the illumination is automatically performed and stopped in accordance with the use state of the hammer drill 1, whereby the operability is enhanced. Since the LED 97 is turned off after the predetermined time has elapsed after the off operation of the trigger 10, the afterglow of the LED 97 can be used for the other operation immediately after the use of the hammer drill 1.

The position of the LED need not be exactly at the center in the right-left direction, and may be slightly offset right or left. The position in the upper-lower direction is also not limited to that of the embodiment described above, and can be modified as appropriate. The LED may be arranged such that its angle is adjustable in the upper-lower direction and the right-left direction. Furthermore, more than one LED may be provided, and, for example, a light emitter other than the LED or a laser pointer can be employed as the light-emitting member. The afterglow function of the light-emitting member can be omitted such that the light-emitting member is turned off at the same time as the off operation of the trigger.

Effects of the Invention Related to Connection of Sliding Portion

As described above, with the dust collection device 50 and the hammer drill 1 of the embodiment described above, the connection port 68, which is provided on the left side of the main body case 51, is connected to the base end of the sliding portion 53. The inlet port 140 communicating with the connection port 68 is provided on the left side surface of the dust box 52. As a result, the sliding portion 53 does not become an obstacle by projecting rearward, and the shape of the main body housing 2 of the hammer drill 1 is less likely to be limited. Since the dust is suctioned from the side surface of the dust box 52, the filter 147 is hardly clogged.

In particular in this case, since the connection port 68 is disposed on the upper half side in the central portion in the front-rear direction of the dust box 52, the dust is hardly stuck although the connection port 68 is provided at the side surface. Since the sliding portion 53 is disposed in the position offset toward the left side surface provided with the connection port 68 to which the flexible hose 112 serving as a base end is connected, the inner pipe 110 that has moved back does not interfere with the hammer drill 1, so that the slide stroke can be set to a large value. Furthermore, since the flexible hose 112 is connected to the connection port 68 from a direction intersecting with the connection port 68, the amount of projection can be reduced although the sliding portion 53 is offset leftward.

Since the connection port 68 opening rearward through the elbow 113 is connected to the flexible hose 112 from behind, the sliding portion 53 that slides forward and rearward can be connected to the connection port 68 without difficulty.

Furthermore, since a predetermined distance is set between the inlet port 140 and the filter 147 in the dust box 52, and the wall 149 is provided to the side surface of the filter 147 facing the inlet port 140. Accordingly, the dust having entered through the inlet port 140 does not come into direct contact with the side surface of the filter 147. The side surface of the filter 147 facing the inlet port 140 is prevented from being clogged.

The right-left position of the sliding portion may be reversed from that of the embodiment described above. The positions of the holder, the connection port, and the inlet port of the dust box may be changed to the right side surface side, accordingly. The position of the connection port in the main body case can also be moved in the upper-lower direction and/or the front-rear direction. The flexible hose is not limited to being connected from behind. The elbow may open obliquely rearward and downward, or downward, and the flexible hose may be connected obliquely from behind and below, or from below.

Effects of the Invention Related to Protection of Lead Wires

As described above, with the dust collection device 50 and the hammer drill 1 of the embodiment described above, the main body case 51 is provided therein with the partitioning portions (the inner rib 102, the front vertical rib 104, and the rear vertical rib 105). The partitioning portions inhibit the contact between the air flow and the wiring by partitioning the flow path of the air flow passing through the accommodating chamber 61*a* for the DC motor 88 from the wiring (the lead wires 75*a*, 88*a*, and 98*a*) in the main body case 51. As a result, a risk of damage to the wiring caused by the air flow cooling the DC motor 88 can be reduced. In particular in this case, since the DC motor 88 is accommodated in the main body case 51 in the attitude in which the output shaft 89 extends in the front-rear direction, the flow path of the air flow can be easily partitioned from the wiring in the accommodating chamber 61*a*.

Since the dust box 52 is disposed below the main body case 51, and the DC motor 88 is accommodated above the dust box 52, the main body case 51 has a compact shape with reduced front-rear and upper-lower dimensions. Furthermore, the main body case 51 is formed by assembling the pair of left and right half-split cases 51*a* and 51*b*. The partitioning portions are formed by butting the inner rib 102 to the front and rear ribs 104 and 105, the inner rib 102 and the front and rear ribs 104 and 105 being provided in an erect manner on the inner surfaces of the half-split cases 51*a* and 51*b*, respectively. As a result, a reasonable configuration is obtained in which the partitioning portions are formed as the half-split cases 51*a* and 51*b* are assembled. Since the dust collection side controller 101 is disposed behind the accommodating chamber 61*a* for the DC motor 88 in the main body case 51, the lead wires 88*a* between the dust collection side controller 101 and the DC motor 88 can be wired at the shortest distance.

The inner rib and the front and rear vertical ribs may be provided in the half-split cases with the right-left relation reversed. Instead of using the front and rear vertical ribs on one of the half-split cases, the inner rib can be provided in each of the right and left half-split cases to partition the air intake chamber. Furthermore, the DC motor is not limited to being accommodated above the dust box, but may be accommodated behind the dust box as long as the air flow can be partitioned from the wiring, and may be accommodated in the upper-lower direction instead of in the front-rear direction.

Effects of the Invention Related to Dust Collection System

As described above, with the dust collection system S of the embodiment described above, the coupling piece 46, which is integrally provided on the shutter member 43 in the hammer drill 1, projects into the guide groove 44 in the close position of the plug-in port 36. When the rail portion 85 of the main body case 51 fits with the guide groove 44 of the main body housing 2, the rail portion 85 moves the shutter member 43 to the open position of the plug-in port 36 by engaging with the coupling piece 46 of the shutter member 43. Consequently, a reasonable structure is obtained in which the rail portion 85 for connection of the dust collection device 50 is used also for moving the shutter member 43. As a result, the connection and the electrical coupling between the hammer drill 1 and the dust collection device 50 can be achieved with a simple structure with a small number of components.

Particularly in this case, the guide groove 44 and the rail portion 85 are formed to extend in the upper-lower direction, so that the dust collection device 50 can be easily attached to and detached from the hammer drill 1. Since the shutter member 43 is rotatable between the open position and the close position of the plug-in port 36 and rotatably urged toward the close position by the torsion spring 42, the space for the shutter member 43 can be saved. Furthermore, when the main body case 51 is attached from below to the main body housing 2, the engaging pawl 48 provided on lower surface of the main body housing 2 and the hook plate 76 provided on the upper surface of the main body case 51 engage with each other in the attached state. Due to the engagement of the engaging pawl 48 and the hook plate 76, the main body housing 2 and the main body case 51 can be reliably connected together via the upper and lower mating surfaces thereof.

Since the hook plate 76 can be operated to a position for release from the engaging pawl 48 by one release button 80 provided at the main body case 51, the dust collection device 50 can be easily detached. The front end surface 5*a* and the abutting piece 87 are provided on the outer surface of the front housing 5 and the upper surface of the main body case 51, respectively. The front end surface 5*a* and the abutting piece 87 restricts the movement in the front-rear direction in the attached state of the main body case 51 by abutting each other, and thus the dust collection device 50 can be attached so as to be free from the rattling.

In the embodiment described above, the coupling piece is provided at the support pin that is a separate body from the female connector provided with the shutter member. The coupling piece may, however, be provided in an integrated manner with the shutter member. The present invention is not limited to the case where the female connector and the shutter member are provided in an integrated manner. The female connector and the shutter member may be configured such that the female connector is fixed in the downward position, and only the shutter member as a separate body is movable relative to the plug-in port. The shutter member may move linearly instead of rotationally.

Furthermore, the guide groove and the rail portion may be formed to extend in the front-rear direction instead of in the upper-lower direction, so that the dust collection device may be attached from the front of the hammer drill. In this case, the front surface of the main body housing and the rear surface of the main body case serve as mating surfaces provided with engaging portions.

Figure 14:
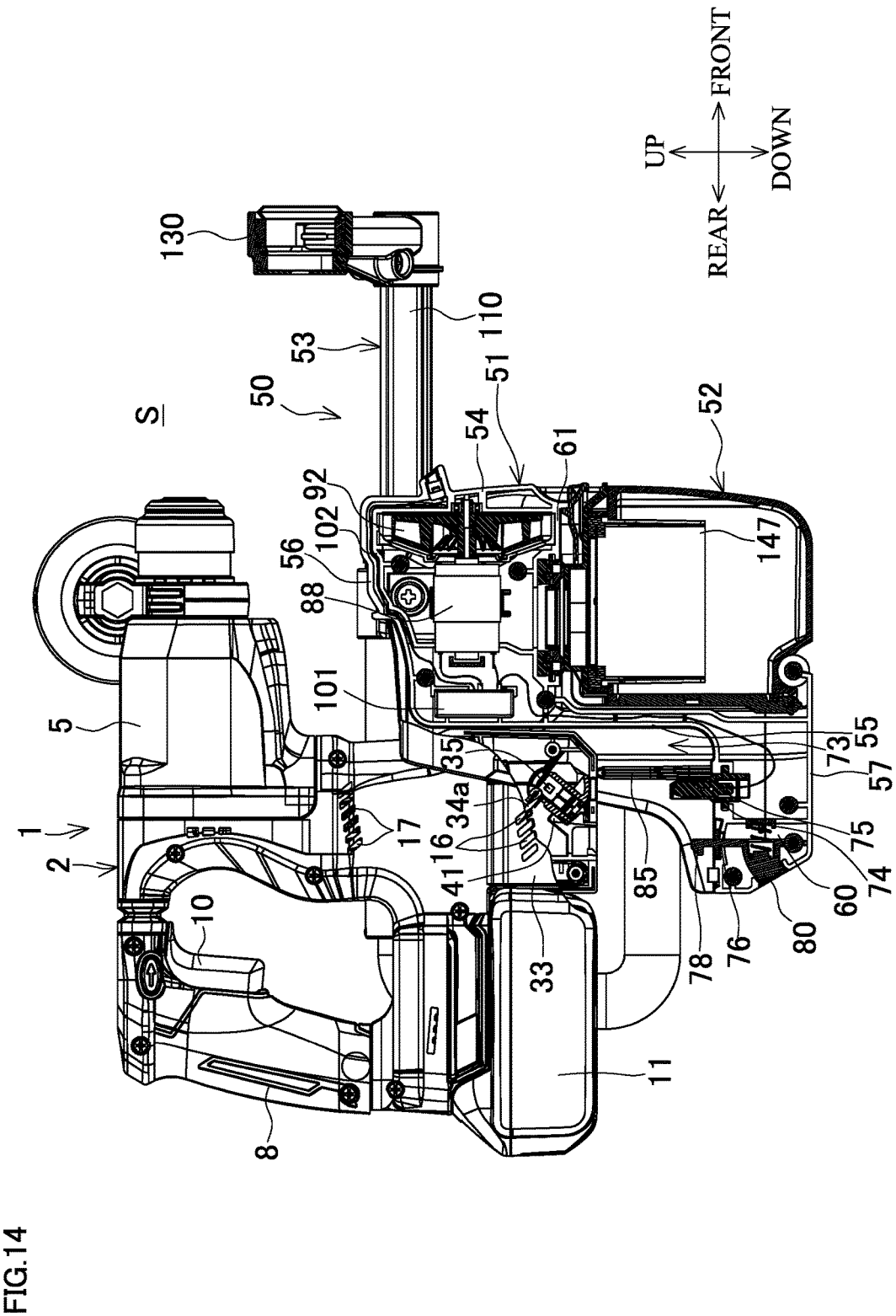
FIG. 14 is a side explanatory view of the dust collection system in which a shielding plate is provided at a female connector of the hammer drill (the dust collection device for an electric power tool is being attached).
Figure 15:
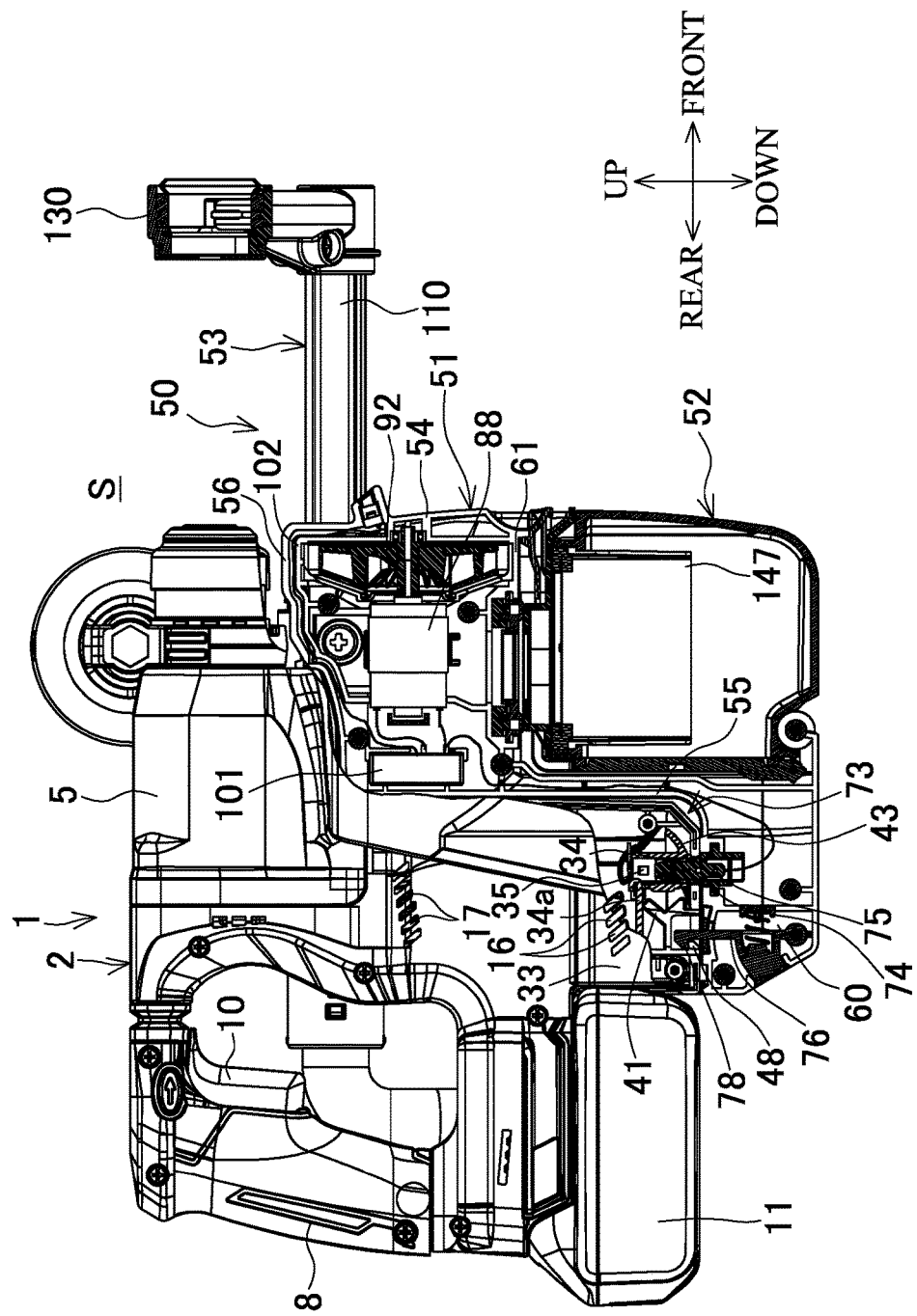
FIG. 15 is a side explanatory view of the dust collection system in which the shielding plate is provided at the female connector of the hammer drill (the dust collection device for an electric power tool has been attached).

As illustrated in FIGS. 14 and 15, a shielding plate 34a projecting rearward in the downward position is connected in an integrated manner with a rear portion of the upper end of the female connector 34. In this state, the shielding plate 34a may project rearward between the electric power tool side air intake ports 16 located above and the stopper 41 when the dust collection device 50 is attached. When the shielding plate 34a described above is provided, the upper side of the connecting portion between the female connector 34 and the male connector 74 is covered by the shielding plate 34a. As a result, foreign matter, such as water, that has entered from the electric power tool side air intake ports 16, 16 can be prevented from entering the connecting portion.

In any aspect of the present invention, the configuration of the hammer drill may be such that the motor is laterally mounted, and/or is an alternating-current (AC) motor, instead of the DC motor, using a commercial power supply as the power source. The present invention may be applied not only to the hammer drill, but also to other electric power tools, such as electric drills, as long as the dust collection device is attachable thereto.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A dust collection device for an electric power tool comprising:
    a main body case that (1) includes an air exhaust port, (2) is attachable to an electric power tool, and (3) includes a connection port;
    a dust box with a filter and an inlet port; and
    a tubular sliding portion that (1) has a base end that is connected to the connection port, (2) includes a suction port at its front end, and (3) is slidable along a longitudinal axis in a front-rear direction, wherein:
    a dust collection path is formed in the dust collection device to extend from the suction port through the filter to the air exhaust port;
    the connection port is on a right side surface or a left side surface of the main body case;
    the inlet port is in a right side surface or a left side surface of the dust box; and
    the inlet port communicates with the connection port.

2. The dust collection device for an electric power tool according to claim 1, wherein the connection port is disposed on an upper half side in a central portion in the front-rear direction of the dust box.

3. The dust collection device for an electric power tool according to claim 1, wherein the sliding portion is disposed in a position offset in a right and left direction toward the side surface of the main body case provided with the connection port, and a hose serving as a base end is connected to the connection port.

4. The dust collection device for an electric power tool according to claim 3, wherein a light-emitting member configured to emit light forward is provided on a front surface of the main body case.

5. The dust collection device for an electric power tool according to claim 4, wherein the light-emitting member is disposed at a center in the light and left direction of the front surface of the main body case.

6. The dust collection device for an electric power tool according to claim 3, wherein the hose is connected to the connection port from a direction intersecting with the connection port.

7. The dust collection device for an electric power tool according to claim 6, wherein the connection port opens rearward, and the hose is connected to the connection port from behind.

8. The dust collection device for an electric power tool according to claim 7, wherein the connection port is provided with an L-shaped tubular elbow that opens rearward, and the hose is connected to the connection port from behind through the elbow.

9. The dust collection device for an electric power tool according to claim 1, wherein a predetermined distance is set between the inlet port and the filter in the dust box, and a wall is provided to a side surface of the filter, which faces the inlet port.

10. The dust collection device for an electric power tool according to claim 1, wherein an O-ring is disposed between the connection port and the inlet port.

11. The dust collection device for an electric power tool according to claim 1, wherein an accommodating recess configured to accommodate the dust box is formed on the main body case so as to open forward, and the dust box is attachable to and detachable from the accommodating recess at the front.

12. The dust collection device for an electric power tool according to claim 1, wherein a motor and a dust collection fan are accommodated in the main body case, and the main body case is provided therein with a partitioning portion partitioning a flow path of an air flow passing through an accommodating chamber for the motor from wiring in the main body case to inhibit contact between the air flow and the wiring.

13. The dust collection device for an electric power tool according to claim 12, wherein the main body case is formed by assembling a pair of right and left half-split cases, and the partitioning portion is formed by butting ribs provided in an erect manner on respective inner surfaces of the half-split cases to each other.

14. An electric power tool comprising the dust collection device for an electric power tool according to claim 1 attached to the electric power tool.

15. A dust collection system comprising:
    an electric power tool that is provided, on an outer surface of a housing, with a guide groove for attaching the dust collection device for an electric power tool according to claim 1, and that is provided, in the housing, with an electric power tool side terminal that is exposed through a plug-in port and a shutter member that is configured to close the plug-in port when the dust collection device for an electric power tool is not attached; and the dust collection device for an electric power tool according to claim 1 that is provided, on the main body case, with a rail portion for being attached to the housing by fitting with the guide groove, and that is provided with a dust collection side terminal configured to be electrically coupled to the electric power tool side terminal by being inserted from the plug-in port when the dust collection device is attached to the housing, wherein the shutter member is provided with a coupling portion configured to project into the guide groove in a close position of the plug-in port, and the rail portion is configured to engage with the coupling portion and to move the shutter member to an open position of the plug-in port when the rail portion of the main body case fits with the guide groove of the housing.

16. A dust collection device for an electric power tool comprising:

a main body case that includes an air exhaust port and that is attachable to an electric power tool;

a dust box provided therein with a filter; and a tubular sliding portion that has a base end to which a connection port provided on the main body case is connected, that includes a suction port at its front end, and that is slidable in a front-rear direction, wherein a dust collection path is formed in the dust collection device to extend from the suction port through the filter to the air exhaust port, the connection port is provided on a side surface of the main body case and connected to the base end of the sliding portion, and a side surface of the dust box is provided with an inlet port communicating with the connection port, and the sliding portion is disposed in a position offset in a right and left direction toward the side surface of the main body case provided with the connection port, and a hose serving as a base end is connected to the connection port.

17. A dust collection device for an electric power tool comprising:

a main body case that includes an air exhaust port and that is attachable to an electric power tool;

a dust box provided therein with a filter; and a tubular sliding portion that has a base end to which a connection port provided on the main body case is connected, that includes a suction port at its front end, and that is slidable in a front-rear direction, wherein a dust collection path is formed in the dust collection device to extend from the suction port through the filter to the air exhaust port, the connection port is provided on a side surface of the main body case and connected to the base end of the sliding portion, and a side surface of the dust box is provided with an inlet port communicating with the connection port, and a predetermined distance is set between the inlet port and the filter in the dust box, and a wall is provided to a side surface of the filter, which faces the inlet port.

* * * * *